United States Patent
Bhalla et al.

(10) Patent No.: US 11,061,399 B2
(45) Date of Patent: Jul. 13, 2021

(54) SYSTEM AND METHOD FOR PROVIDING INFORMATION INDICATIVE OF AUTONOMOUS AVAILABILITY

(71) Applicant: Samsung Electronics Co., Ltd., Suwon-si (KR)

(72) Inventors: Sameer M. Bhalla, San Francisco, CA (US); Nicholas C. Fishwick, San Francisco, CA (US); Julia A. Wolinsky, San Francisco, CA (US); Yun Z. Wu, Los Angeles, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 16/228,508

(22) Filed: Dec. 20, 2018

(65) Prior Publication Data

US 2019/0204827 A1 Jul. 4, 2019

Related U.S. Application Data

(60) Provisional application No. 62/613,243, filed on Jan. 3, 2018, provisional application No. 62/613,270, filed on Jan. 3, 2018.

(51) Int. Cl.
*G05D 1/00* (2006.01)
*B60W 30/08* (2012.01)
(Continued)

(52) U.S. Cl.
CPC .......... *G05D 1/0061* (2013.01); *B60W 40/08* (2013.01); *B60W 50/14* (2013.01); *B60W 50/16* (2013.01);
(Continued)

(58) Field of Classification Search
CPC . G05D 1/00; G01C 22/00; B60Q 9/00; B60Q 1/00; B60W 50/02; B60W 30/08;
(Continued)

(56) References Cited

U.S. PATENT DOCUMENTS 8,433,470 B1 4/2013 Szybalski et al.
8,457,827 B1 * 6/2013 Ferguson ........ B60W 30/18163
701/23

(Continued)

FOREIGN PATENT DOCUMENTS

CN 104057956 A * 9/2014 ............ B60W 30/08
JP 3758443 B2 3/2006
(Continued)

OTHER PUBLICATIONS

International Search Report & Written Opinion dated Jun. 21, 2019 for International Application PCT/KR2019/004121 from Korean Intellectual Property Office, pp. 1-9, Republic of Korea.

*Primary Examiner* — Yuri Kan
(74) *Attorney, Agent, or Firm* — Sherman IP LLP; Kenneth L. Sherman; Hemavathy Perumal

(57) ABSTRACT

One embodiment provides a system comprising at least one processor and a non-transitory processor-readable memory device storing instructions that when executed by the at least one processor causes the at least one processor to perform operations including to obtain sensor data of a vehicle operating in an autonomous mode, determine a confidence level for continued operation of the vehicle in the autonomous mode based on the obtained sensor data, and selectively trigger a handoff protocol based on the confidence level determined. Movement of the vehicle is autonomously controlled in the autonomous mode. The handoff protocol comprises providing information to at least one input/output (I/O) device inside the vehicle as an alert of an upcoming (Continued)

transition from operating the vehicle in the autonomous mode to a manual mode.

20 Claims, 31 Drawing Sheets

(51) Int. Cl.
  *B60Q 1/00* (2006.01)
  *B60W 50/16* (2020.01)
  *B60W 50/14* (2020.01)
  *B60W 40/08* (2012.01)
  *G02B 27/01* (2006.01)

(52) U.S. Cl.
  CPC . *B60W 2050/143* (2013.01); *B60W 2050/146* (2013.01); *G02B 27/0101* (2013.01); *G02B 2027/0141* (2013.01); *G05D 2201/0213* (2013.01)

(58) Field of Classification Search
  CPC ...... B60W 60/00; B60W 30/09; B60W 50/08; B60K 28/06; G06F 17/00; B60T 7/12; G06K 9/62
  See application file for complete search history.

(56) References Cited

U.S. PATENT DOCUMENTS

| | | | |
|---|---|---|---|
| 8,818,608 B2 | 8/2014 | Cullinane et al. | |
| 8,954,217 B1 | 2/2015 | Monternerlo et al. | |
| 9,684,306 B2 | 6/2017 | Sprigg | |
| 9,802,622 B2 | 10/2017 | Park | |
| 9,823,657 B1* | 11/2017 | Palmer | G07C 5/008 |
| 1,033,621 A1* | 7/2019 | Fields et al. | B60W 30/09 |
| 2006/0015221 A1* | 1/2006 | Sarkar | B60N 2/0248 |
| | | | 701/2 |
| 2011/0128139 A1* | 6/2011 | Tauchi | B60Q 9/008 |
| | | | 340/439 |
| 2013/0211656 A1 | 8/2013 | An et al. | |
| 2014/0114536 A1* | 4/2014 | Kobana | B60T 7/12 |
| | | | 701/49 |
| 2016/0179092 A1* | 6/2016 | Park | B60W 50/10 |
| | | | 701/23 |
| 2017/0236210 A1 | 8/2017 | Kumar et al. | |
| 2017/0349186 A1* | 12/2017 | Miller | B60W 40/08 |
| 2017/0368936 A1* | 12/2017 | Kojima | B60K 28/06 |
| 2018/0079358 A1* | 3/2018 | Kelly | G08B 6/00 |
| 2018/0229737 A1* | 8/2018 | Towal | B60W 10/18 |
| 2019/0122073 A1* | 4/2019 | Ozdemir | A61B 6/5217 |
| 2020/0377126 A1* | 12/2020 | Obata | G01C 21/36 |

FOREIGN PATENT DOCUMENTS

| | | |
|---|---|---|
| JP | 2014164424 A | 9/2014 |
| JP | 2015-217798 A | 12/2015 |
| JP | 6136812 | 5/2017 |
| JP | 2017-206133 | 11/2017 |
| WO | 2015071035 A1 | 5/2015 |
| WO | 2017021099 A1 | 2/2017 |

\* cited by examiner

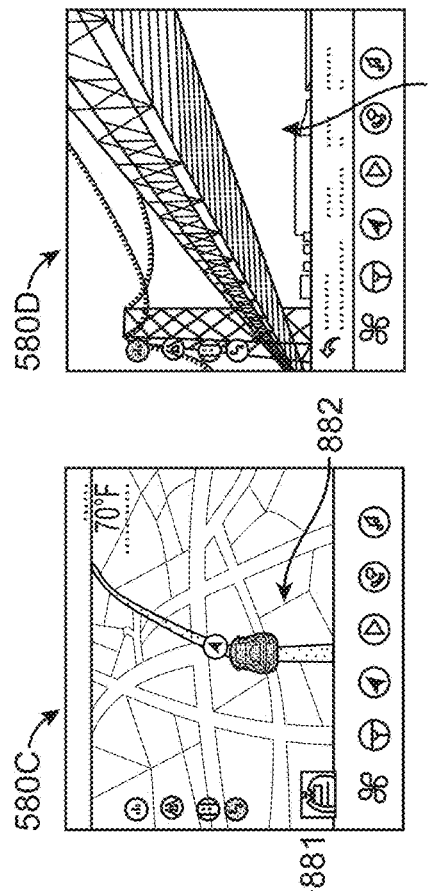
FIG. 9A
FIG. 9B
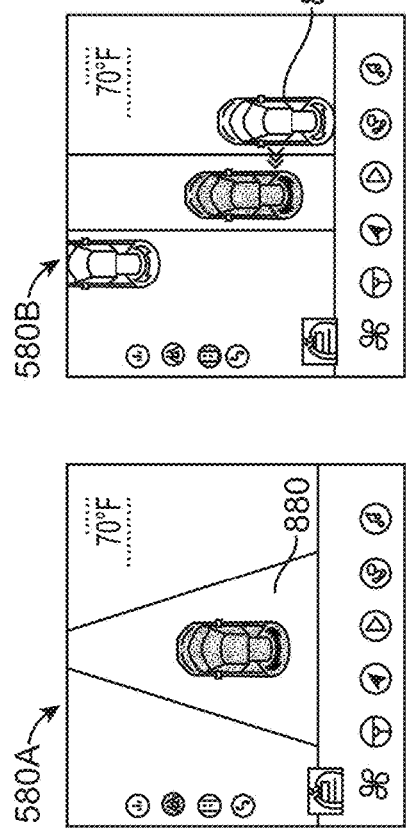
FIG. 9C
FIG. 9D
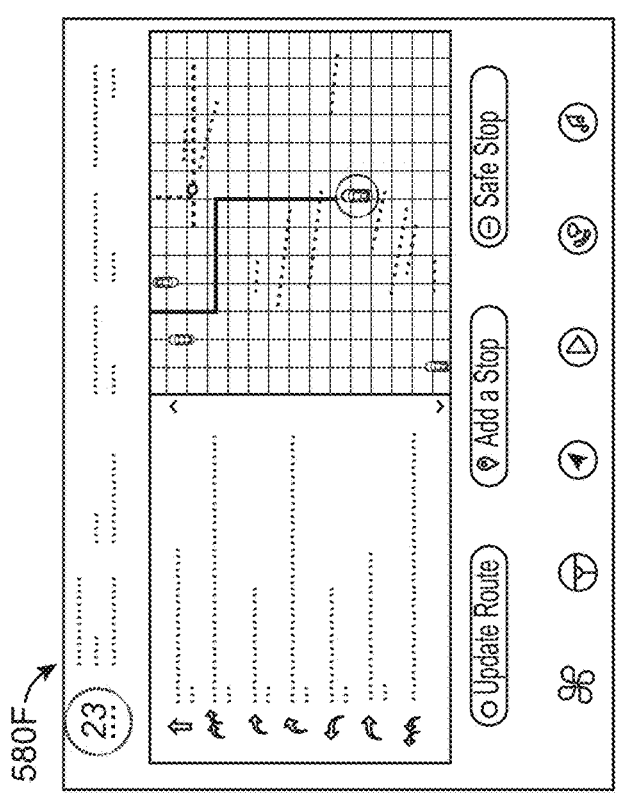
FIG. 9E
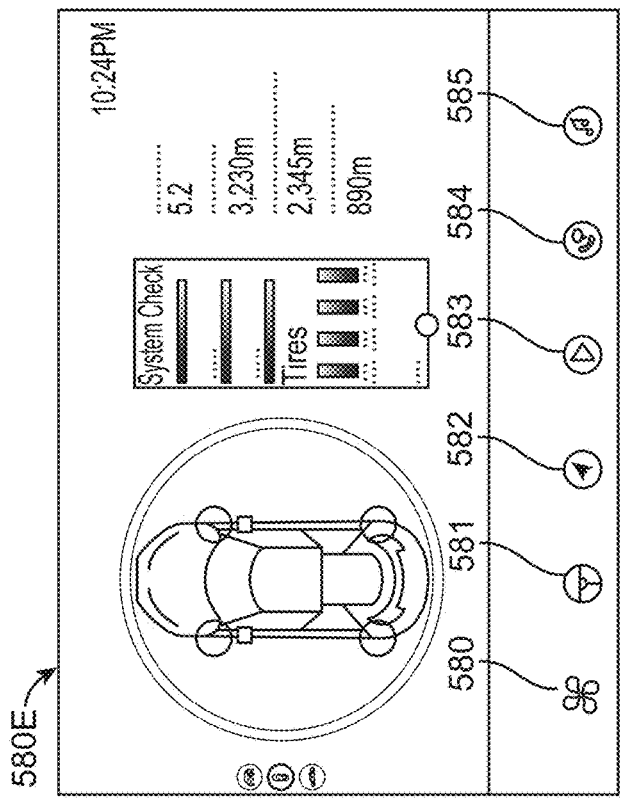
FIG. 9F

SYSTEM AND METHOD FOR PROVIDING INFORMATION INDICATIVE OF AUTONOMOUS AVAILABILITY

CROSS-REFERENCE TO RELATED APPLICATIONS

This application claims the priority benefit of U.S. Provisional Patent Application Ser. No. 62/613,243, filed Jan. 3, 2018, and U.S. Provisional Patent Application Ser. No. 62/613,270, filed Jan. 3, 2018, all incorporated herein by reference in their entirety.

TECHNICAL FIELD

One or more embodiments relate generally to autonomous drive systems for vehicles, and in particular, to a system and method for providing information indicative of autonomous availability.

BACKGROUND

The Society of Automotive Engineers (SAE) International standard defines six different automation levels in the context of vehicles and their operation on roadways. The six different automation levels are as follows: (1) Level 0 where no automation is available, (2) Level 1 where driver assistance is required, (3) Level 2 where partial automation is available, (4) Level 3 where conditional automation is available, (5) Level 4 where high automation is available, and (6) Level 5 where full automation is available. For Level 0 to Level 2, a human driver monitors the driving environment (i.e., surroundings). For Level 3 to Level 5, an autonomous drive system (i.e., automated driving system) monitors the driving environment.

SUMMARY

One embodiment provides a system comprising at least one processor and a non-transitory processor-readable memory device storing instructions that when executed by the at least one processor causes the at least one processor to perform operations including to obtain sensor data of a vehicle operating in an autonomous mode, determine a confidence level for continued operation of the vehicle in the autonomous mode based on the obtained sensor data, and selectively trigger a handoff protocol based on the confidence level determined. Movement of the vehicle is autonomously controlled in the autonomous mode. The handoff protocol comprises providing information to at least one input/output (I/O) device inside the vehicle as an alert of an upcoming transition from operating the vehicle in the autonomous mode to a manual mode.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 9A illustrates a first example UI including a first example dynamic map view displayed on the sensor view tab of the infotainment console, in accordance with an embodiment.

FIG. 9B illustrates a second example UI including a second example dynamic map view displayed on the sensor view tab of the infotainment console, in accordance with an embodiment.

FIG. 9C illustrates a third example UI including a third example dynamic map view displayed on the sensor view tab of the infotainment console, in accordance with an embodiment.

FIG. 9D illustrates a fourth example UI including a fourth example dynamic map view displayed on the sensor view tab of the infotainment console, in accordance with an embodiment.

FIG. 9E illustrates an example UI displayed on a car tab of an infotainment console inside a vehicle in autonomous mode, in accordance with an embodiment.

FIG. 9F illustrates an example UI displayed on a navigation tab of an infotainment console inside a vehicle in autonomous drive, in accordance with an embodiment.

DETAILED DESCRIPTION

Figure 1:
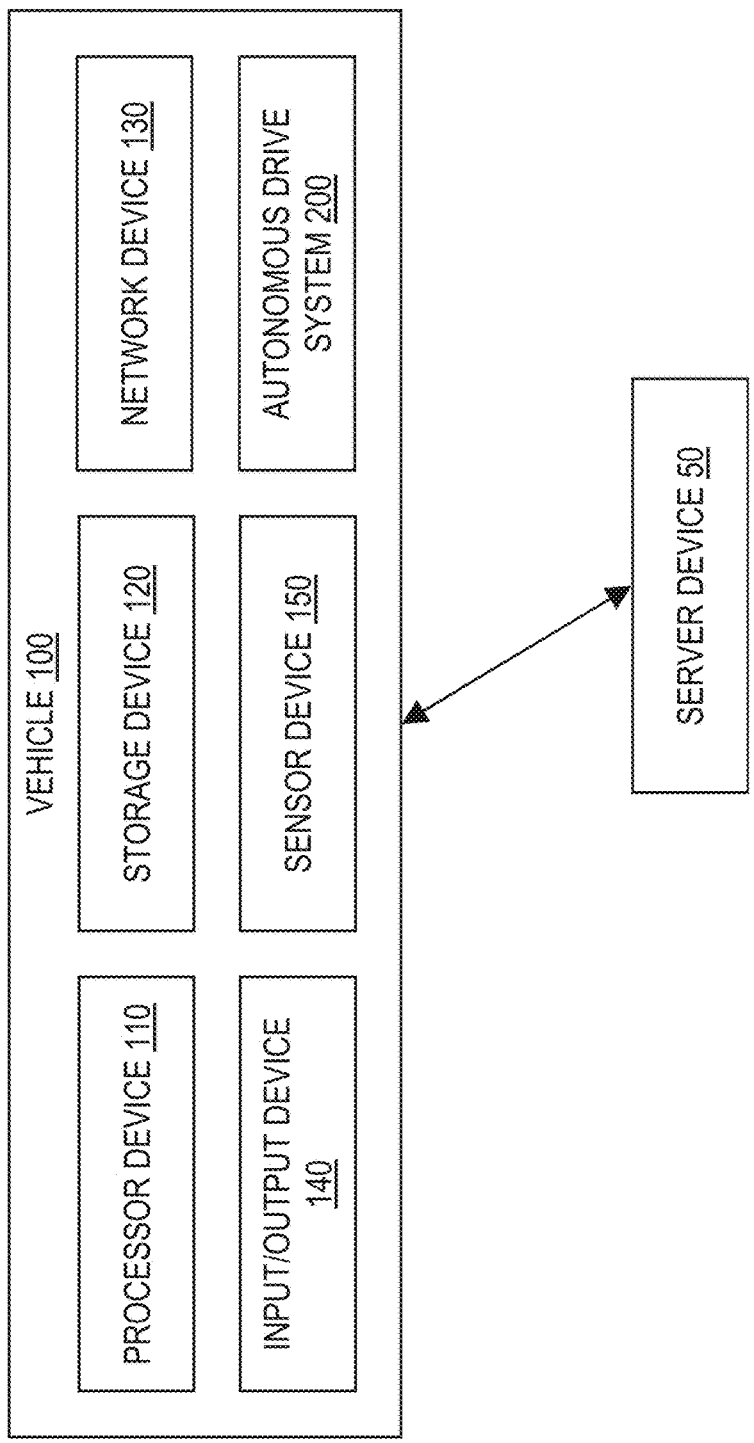
FIG. 1 illustrates an example vehicle including an autonomous drive system, in accordance with an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to autonomous drive systems for vehicles, and in particular, to a system and method for providing information indicative of autonomous availability. One embodiment provides a system comprising at least one processor and a non-transitory processor-readable memory device storing instructions that when executed by the at least one processor causes the at least one processor to perform operations including to obtain sensor data of a vehicle operating in an autonomous mode, determine a confidence level for continued operation of the vehicle in the autonomous mode based on the obtained sensor data, and selectively trigger a handoff protocol based on the confidence level determined. Movement of the vehicle is autonomously controlled in the autonomous mode. The handoff protocol comprises providing information to at least one input/output (I/O) device inside the vehicle as an alert of an upcoming transition from operating the vehicle in the autonomous mode to a manual mode.

For expository purposes, the term "vehicle" as used herein generally refers to any type of vehicle, such as, but not limited to, a personal vehicle (e.g., a car, a motorcycle, a moped, etc.), a commercial vehicle (e.g., a delivery van, etc.), a passenger vehicle (e.g., a bus), etc.

For expository purposes, the term "user" as used herein generally refers to an individual inside a vehicle, such as, but not limited to, a driver of the vehicle, a passenger of the vehicle, etc.

For expository purposes, the term "roadways" as used herein generally refers to accessible roadways, including parking areas and driveways, that collectively serve users of vehicles of all classes and driving automation levels (Level 0 to Level 5), as well as motorcyclists, pedal cyclists, and pedestrians.

For expository purposes, the term "alert" as used herein generally refers to any type of communication to a user that is important or time sensitive. The terms "alert" and "notification" are used interchangeably herein.

For expository purposes, the term "autonomous mode" as used herein generally refers an operating mode of a vehicle in which the vehicle drives autonomously, i.e., movement of the vehicle is autonomously controlled.

For expository purposes, the term "manual mode" as used herein generally refers an operating mode of a vehicle in which a driver drives the vehicle, i.e., movement of the vehicle is manually controlled by the driver.

Existing automotive technology is about five to ten years away from fully autonomous vehicles becoming common and feasible in our everyday lives. Presently, most advanced self-driving vehicles available on the market are Level 2 autonomous vehicles. Some existing autonomous vehicles provide some higher-level autonomous functionality in limited and controlled environments, such as Level 3 autonomous functionality on freeways only, or some Level 4 autonomous functionality such as autonomous parking only. There are no existing solutions, however, that are capable of handling different driving situations and that allow for both manual drive and autonomous drive to co-exist. For example, there are no existing solutions that pre-emptively warn a driver when an autonomous vehicle can no longer safely drive autonomously so that the driver can prepare to take over control of the vehicle. Further, there are no existing solutions that inform a driver whether autonomous drive is available at any point in time or whether autonomous drive is available on portions of a route.

FIG. 1 illustrates an example vehicle 100 including an autonomous drive system 200, in accordance with an embodiment. The vehicle 100 is a higher-level autonomous vehicle (i.e., self-driving vehicle). For example, in one embodiment, the vehicle 100 is a Level 3 autonomous vehicle that can be driven manually (i.e., in manual drive or the manual mode) or autonomously (i.e., in autonomous drive or the autonomous mode). A Level 3 autonomous vehicle requires a driver of the vehicle to take over driving of the vehicle in situations where the vehicle can no longer safely drive autonomously.

The vehicle 100 is equipped with one or more computation resources such as, but not limited to, one or more processor devices 110, one or more storage devices 120, and one or more network devices 130. One or more applications may execute/operate on the vehicle 100 utilizing the one or more computation resources of the vehicle 100.

In one embodiment, the one or more applications that execute/operate on the vehicle 100 include, but are not limited to, an autonomous drive system 200 configured to provide different user interface/user experience (UI/UX) designs for different states of the vehicle 100, wherein each UI/UX design for each state allows one or more users inside the vehicle 100 to access information that is optimized for the state. In one embodiment, the different states include, but are not limited to, autonomous mode, manual mode, transitioning from the manual mode to the autonomous mode, and transitioning from the autonomous mode to the manual mode.

In one embodiment, the system 200 provides UI/UX designs with features designed for vehicle safety and improved driving, such as technologies that alert a driver of the vehicle 100 to potential problems to avoid collisions and accidents, or technologies that avoid collisions (i.e., collision avoidance) by implementing safeguards and taking over control of the vehicle 100. In one embodiment, if the vehicle 100 is in the autonomous mode, the system 200 is configured to pre-emptively alert the driver that the vehicle 100 can no longer safely drive autonomously. Alerting the driver ahead of time increases a likelihood that the driver is cognitively aware that he/she will need to take over driving the vehicle 100, as the driver may be distracted when the vehicle is in autonomous drive. The UI/UX designs include additional features designed for vehicle safety and improved driving, such as, but not limited to, electronic stability control, anti-lock brakes, lane departure warning, adaptive cruise control, traction control, lighting automation, satnav/traffic warnings, alerting the driver to other cars or dangers, automatic lane centering, blind spots warnings, etc.

In one embodiment, the one or more network devices 130 are configured to exchange data with one or more server devices 50 over a wireless connection (e.g., a WiFi connection, a cellular data connection, a Bluetooth connection, vehicle-to-vehicle communication, or any other type of wireless technology). For example, the system 200 can access a service deployed on a server device 50 (e.g., a radio streaming service). As another example, the system 200 can receive data and/or updates from a server device 50 (e.g., traffic information, navigation data, software updates for the system 200).

In one embodiment, a vehicle 100 comprises one or more input/output (I/O) device 140 integrated in or coupled to the vehicle 100 such as, but not limited to, a display device, an audio device, a haptic feedback device, a keyboard, a keypad, a touch interface (e.g., a touchpad), a control knob, a dial mechanism (e.g., a rotary dial), etc. Examples of a display device include, but are not limited to, a head-up display (or heads-up display) 410 (FIG. 2A), a dashboard display 420 (FIG. 2A), an infotainment console 430 (FIG. 2A), a virtual reality display, an augmented reality display, a light indicator, or a mobile electronic device. Examples of an audio device include, but are not limited to, a speaker device, or a mobile electronic device. Examples of a haptic feedback device include, but are not limited to, a driver seat, a steering wheel, or a mobile electronic device. The driver may utilize an I/O device 140 of the vehicle 100 to configure user preferences (e.g., muting audio alerts), request data (e.g., traffic information, navigation data, infotainment), etc.

As described in detail later herein, the system 200 utilizes at least one I/O device 140 available inside the vehicle 100 to provide information relevant to a state of the vehicle 100. Each state of the vehicle 100 requires the driver to receive different information. Information provided by the system 200 is optimized based on a state of the vehicle 100 and I/O devices 140 that an original equipment manufacturer (OEM) or a vehicle manufacturer make available inside the vehicle 100. The system 200 displays different UIs and different visual styles when the vehicle 100 is in different states to allow the driver to distinguish between the different states. For example, as described in detail later herein, as the vehicle 100 transitions from the autonomous mode to the manual mode, the system 200 is configured to display different alerts on different display devices inside the vehicle 100 to allow the driver to receive, in a timely manner, critical information necessary for safe transfer of control of the vehicle 100 to the driver.

In one embodiment, the system 200 customizes which I/O devices 140 to provide information to based on hardware specifications and/or technology specifications of the vehicle 100 (e.g., specifications from a vehicle manufacturer).

In one embodiment, the vehicle 100 comprises one or more sensor devices 150 integrated in or coupled to the vehicle 100, such as, but not limited to, a GPS, a camera (e.g., exterior cameras, interior facing cameras), a microphone (e.g., interior microphones), a hardware and/or software platform for advanced driver assistance system (e.g., Samsung® DRVLINE™ technology, Mobileye® technology, Nissan® ProPilot™ Assist technology, Tesla™ Autopilot technology), etc. In one embodiment, the system 200 is configured to obtain and leverage sensor data from different sensor devices 150. The sensor data comprises, but is not limited to, one or more of the following: location data indicative of location of the vehicle 100, map data indicative of map views of the vehicle 100, velocity data indicative of speed of the vehicle 100, outside of vehicle data indicative of the driving environment (e.g., obstacles, other vehicles, etc.), or sensory quality data indicative of a quality of raw data obtained from the one or more sensor devices 150 (i.e., relative to a pre-determined threshold).

Figure 2A:
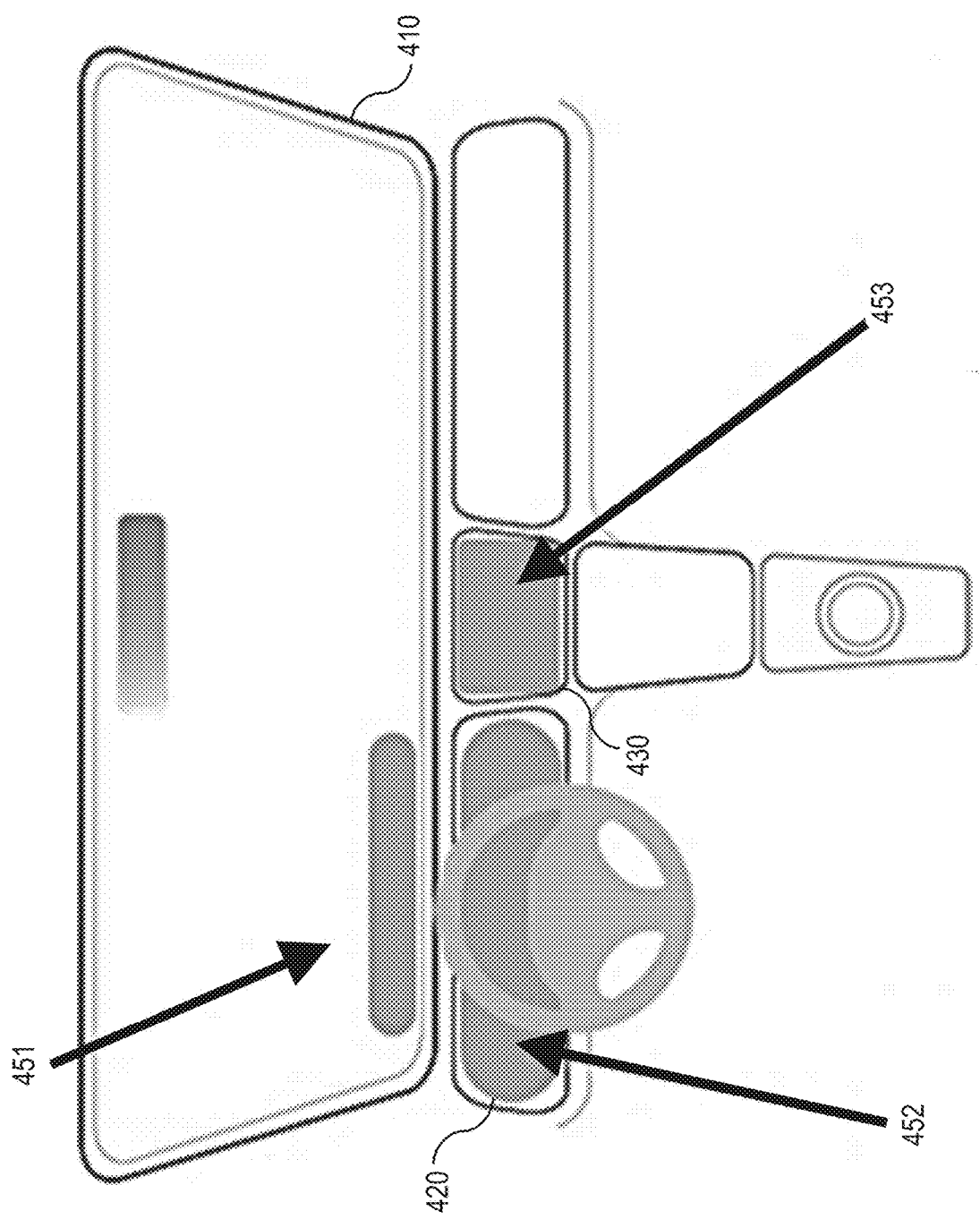
FIG. 2A illustrates different zones of information displayed on different display devices inside a vehicle in the manual mode, in accordance with an embodiment.

FIG. 2A illustrates different zones of information displayed on different display devices inside a vehicle 100 in the manual mode, in accordance with an embodiment. In one embodiment, the system 200 utilizes at least one of the following display devices inside the vehicle 100 to display key visual information to one or more users: a head-up display 410, a dashboard display 420, and an infotainment console 430. In one embodiment, based on a state of the vehicle 100 and a state of the driver, the system 200 can leverage the display devices for certain situations.

For example, if the vehicle 100 is in the manual mode, the system 200 leverages display devices that are within a line of vision of the driver to display critical information for vehicle safety and improved driving. As shown in FIG. 2A, in one embodiment, the system 200 is configured to display the following: a first zone of information 451 on the head-up display 410, a second zone of information 452 on the dashboard display 420, and a third zone of information 453 on the infotainment console 430.

The head-up display 410 comprises one or more augmentations positioned on a windshield of the vehicle 100, wherein each augmentation comprises digital/virtual information (e.g., information that supplements an exterior view in front of the vehicle). The system 200 is configured to support different head-up displays implemented using different augmented reality technologies. For example, the one or more augmentations of the head-up display 410 are projected onto the windshield using projection technology (e.g., a full-windshield projection system), creating one or more augmented reality overlays. As another example, the windshield comprises a transparent area/display designated as the head-up display 410, and the one or more augmentations of the head-up display 410 are displayed on the transparent area/display.

The first zone of information 451 comprises environmental in view information indicative of the driving environment and highlighting important data that is immediately relevant to the driver, such as, but not limited to, obstacle detection data indicative of one or more upcoming obstacles on a roadway the vehicle 100 is on, turn-by-turn navigation data indicative of directions and turns for the driver to make while driving the vehicle 100, etc.

In the manual mode, information displayed on dashboard display 420 is adapted such that the driver is less likely to be distracted by the information, allowing the driver to multitask or deal with situations on the roadway without looking away from the windshield. The second zone of information 452 comprises vehicle status and diagnostics information indicative of a state of the vehicle 100 and diagnostics of the vehicle 100 (i.e., vehicle health), such as, but not limited to, current speed of the vehicle 100, warning lights, etc. The second zone of information 452 provides visual feedback on the dashboard display 420 to allow the driver to easily view, with minimal or no user interaction, important data about the vehicle 100 while driving.

The third zone of information 453 is displayed as visual feedback on the infotainment console 430 that a user can interact with. The third zone of information 453 comprises, but is not limited to, infotainment such as media, autonomous control information for controlling the autonomous mode, navigation data comprising dynamic maps views of the vehicle 100, etc. In one embodiment, the infotainment console 430 is a touch screen or is coupled to a touch interface to allow a user inside the vehicle 100 to control playback of infotainment, select objects displayed on the infotainment console 430, or control the autonomous mode via touch interaction. In one embodiment, the infotainment console 430 is a voice command device that allows a user inside the vehicle 100 to control playback of infotainment, select objects displayed on the infotainment console 430, or control the autonomous mode via voice control. In one embodiment, the infotainment console 430 is coupled to one or more physical controllers (e.g., a control knob, a joystick, a dial mechanism, etc.) to allow a user inside the vehicle 100 to control playback of infotainment, select objects displayed on the infotainment console 430, or control the autonomous mode via physical interaction with the physical controllers.

Figure 2B:
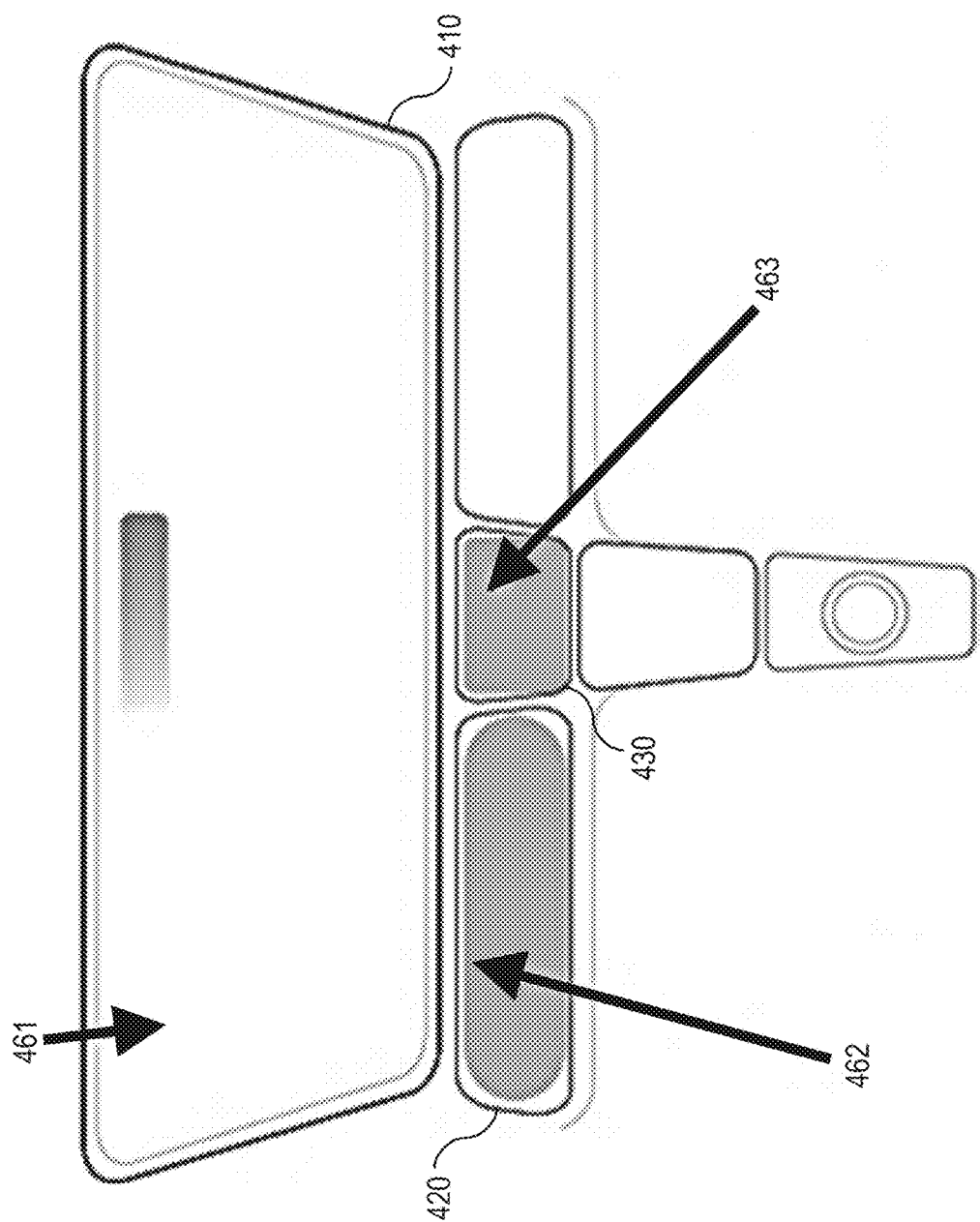
FIG. 2B illustrates different zones of information displayed on different display devices inside a vehicle when the vehicle is in the autonomous mode, in accordance with an embodiment.

FIG. 2B illustrates different zones of information displayed on different display devices inside a vehicle 100 when the vehicle 100 is in the autonomous mode, in accordance with an embodiment. In the autonomous mode, the system 200 leverages display devices that the driver is more likely to utilize when leaning back in the driver seat, such as the infotainment console 430. As shown in FIG. 2B, in one embodiment, the system 200 is configured to display the following during the autonomous mode: a first zone of information 461 on the dashboard display 420, and a second zone of information 462 on the infotainment console 430. In one embodiment, the head-up display 410 is disabled or an amount of information displayed on the head-up display 410 is limited as there is less need for the driver to view information on the head-up display 410 in the autonomous mode.

The first zone of information 461 comprises vehicle status and diagnostics information such as, but not limited to, current speed of the vehicle 100, warning lights, etc.

The second zone of information 462 is displayed as visual feedback on the infotainment console 430 that a user can interact with. The second zone of information 462 comprises, but is not limited to, infotainment such as media, autonomous control information for controlling the autonomous mode, navigation data comprising dynamic maps views of the vehicle 100, etc.

Figure 2C:
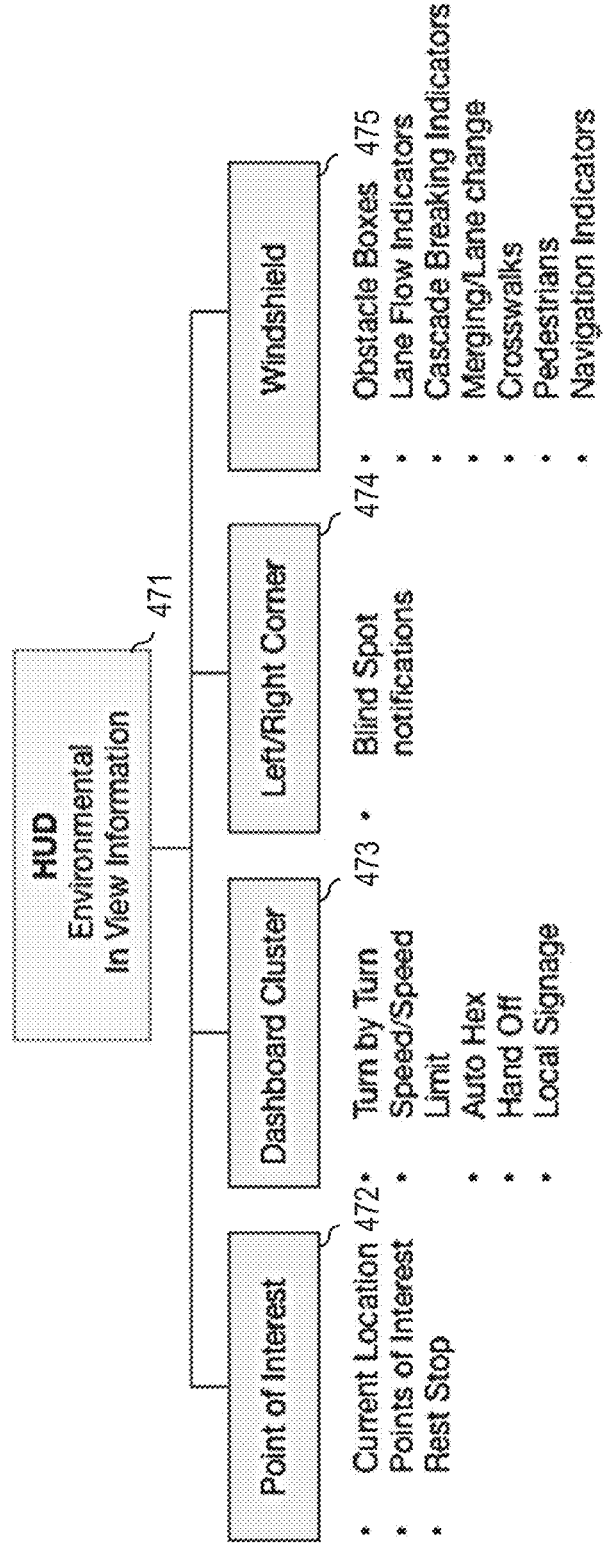
FIG. 2C illustrates a hierarchy of information displayable on a head-up display (or heads-up display) inside a vehicle, in accordance with an embodiment.

FIG. 2C illustrates a hierarchy 470 of information displayable on the head-up display 410, in accordance with an embodiment. In one embodiment, the system 200 is configured to display, on the head-up display 410, environmental in view information 471 indicative of the driving environment. In one embodiment, the environmental in view information 471 comprises different categories of information for display at different locations of the head-up display 410. As shown in FIG. 2C, in one embodiment, the different categories comprise: (1) a points of interest category 472 for display at a first location of the head-up display 410 (e.g., top corner of the windshield and on the side of the driver), (2) a dashboard cluster category 473 for display at a second location of the head-up display 410 (e.g., bottom of the windshield and directly above the dashboard display 420), (3) a left/right corner category 474 for display at opposing corners of the head-up display 410 (i.e., left corner and right corner of the windshield), and (4) a windshield category 475 for display at a third location of the head-up display 410 (e.g., center of the windshield). As further shown in FIG. 2C, the different categories comprise different alerts (e.g., current location of the vehicle 100, current speed of the vehicle 100, alerts for obstacle detection, alerts for blind spots, etc.). As described in detail later herein in reference to FIGS. 7A-7C, the system 200 is configured to selectively display, on the head-up display 410, at least one of these different alerts based on a state of the vehicle 100.

Figure 2D:
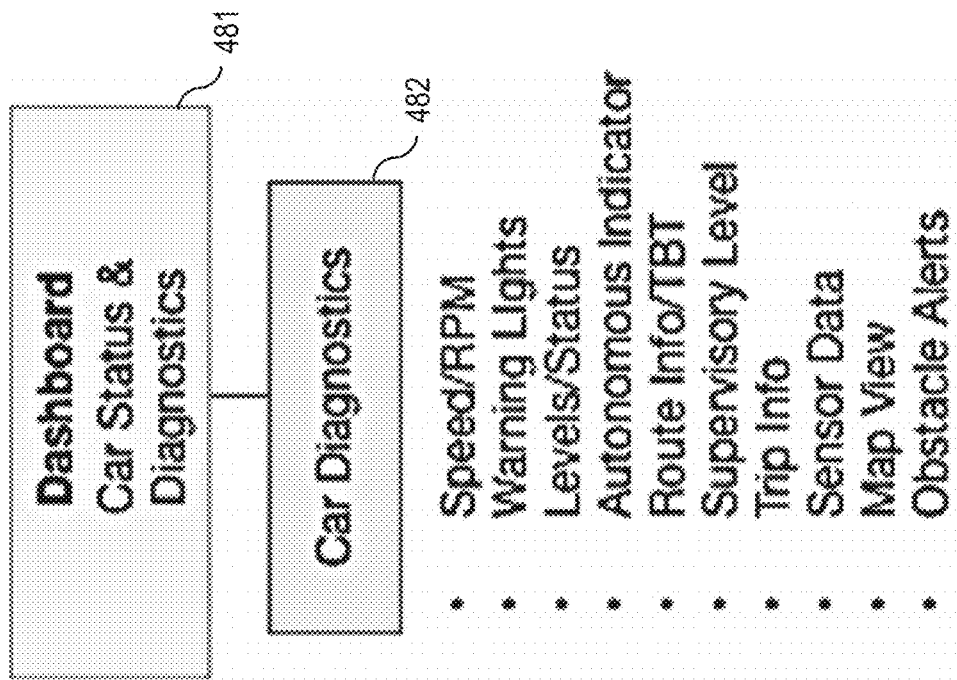
FIG. 2D illustrates a hierarchy of information displayable on a dashboard display inside a vehicle, in accordance with an embodiment.

FIG. 2D illustrates a hierarchy 480 of information displayable on the dashboard display 420, in accordance with an embodiment. In one embodiment, the system 200 is configured to display, on the dashboard display 420, vehicle status and diagnostics information 481 indicative of a state of the vehicle 100 and diagnostics of the vehicle 100. As shown in FIG. 2D, the vehicle status and diagnostics information 481 comprises a car diagnostics category 482 including different alerts (e.g., current state of the vehicle 100, warning lights, current speed of the vehicle 100, dynamic map view of the vehicle 100, etc.). As described in detail later herein in reference to FIGS. 8A-8E, the system 200 is configured to selectively display, on the dashboard display 420, at least one of the different alerts included in the car diagnostics category 482 based on a state of the vehicle 100.

Figure 2E:
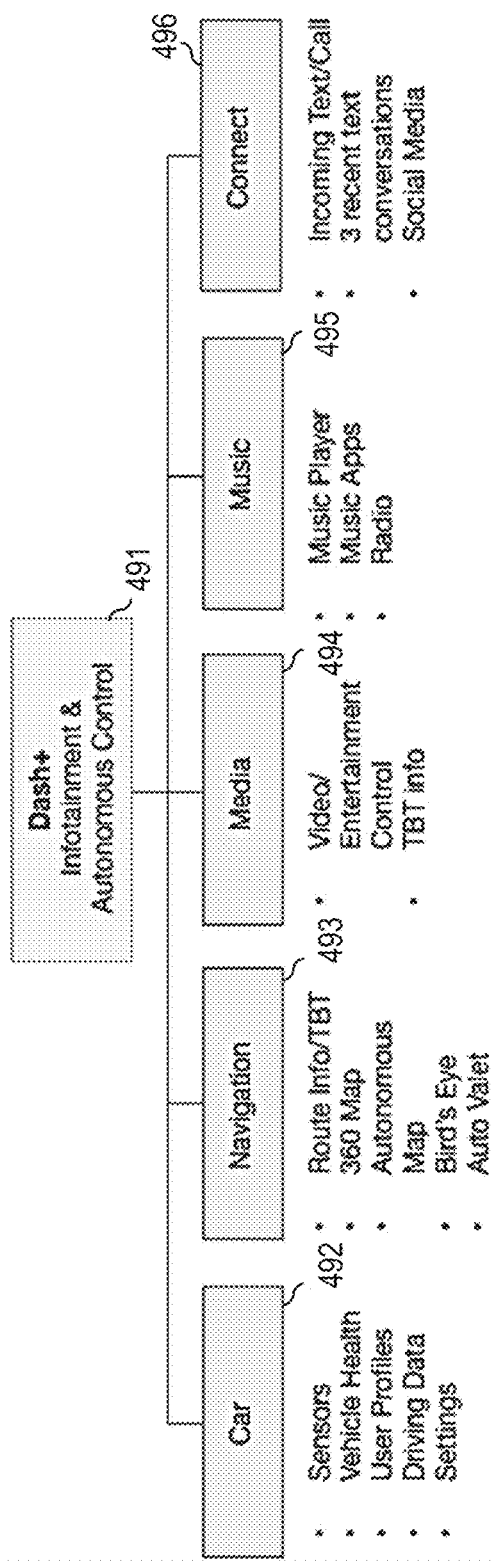
FIG. 2E illustrates a hierarchy of information displayable on an infotainment console inside a vehicle, in accordance with an embodiment.

FIG. 2E illustrates a hierarchy 490 of information displayable on the infotainment console 430, in accordance with an embodiment. In one embodiment, the system 200 is configured to display, on the infotainment console 430, infotainment and autonomous control information 491 indicative of infotainment available for playback, one or more autonomous functions available for user selection, and one or more driver assistance features available for user selection. In one embodiment, the infotainment and autonomous control information 491 comprises different categories of information for display on different selectable tabs of the infotainment console 430. As shown in FIG. 2E, in one embodiment, the different categories comprise: (1) a car category 492 for display on a first selectable tab of the infotainment console 430, (2) a navigation category 493 for display on a second selectable tab of the infotainment console 430, (3) a media category 494 for display on a third selectable tab of the infotainment console 430, (4) a music category 495 for display on a fourth selectable tab of the infotainment console 430, and (5) a connect category 496 for display on a fifth selectable tab of the infotainment console 430. As further shown in FIG. 2E, the different categories comprise different alerts (e.g., incoming text/call, dynamic map view of the vehicle 100, etc.) and features (e.g., music player, etc.). The system 200 is configured to selectively display, on the infotainment console 430, at least one of the different alerts based on a state of the vehicle 100.

Figure 3:
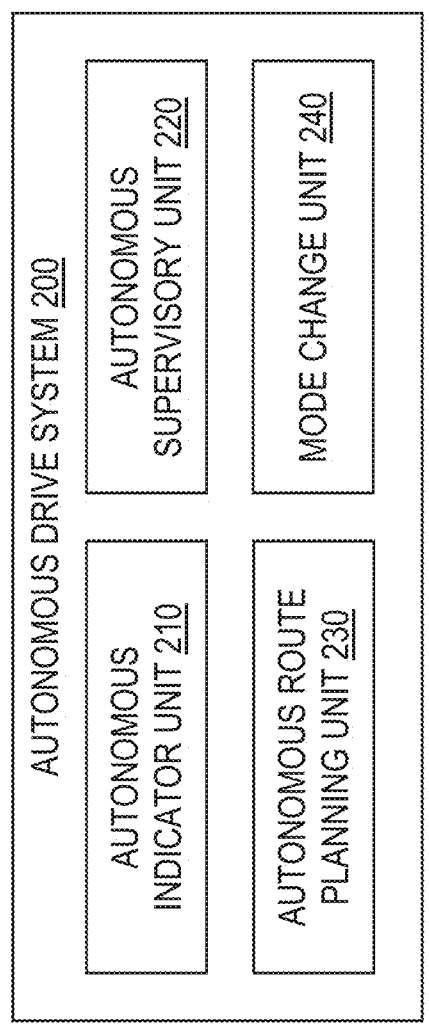
FIG. 3 illustrates an example driving automation system, in accordance with an embodiment.

FIG. 3 illustrates an example driving automation system 200, in accordance with an embodiment. In one embodiment, the system 200 comprises an autonomous indicator unit 210 configured to: (1) determine whether autonomous drive is available for the vehicle 100 at any time based on sensor data of the vehicle 100, and (2) provide autonomous indicator information to at least one I/O device 140 inside the vehicle 100 as an alert indicative of whether autonomous drive is available for the vehicle 100. In one embodiment, the autonomous indicator unit 210 determines whether autonomous drive is available for the vehicle 100 based on at least the following factors: location data, map data, and velocity data.

The autonomous indicator information is provided as a combination of one or more of the following: visual information, audio information, or haptic information. For example, in one embodiment, if the vehicle 100 is in the manual mode, the autonomous indicator unit 210 displays a visual alert (e.g., autonomous indicator 510 in FIG. 4A, autonomous indicator 500 in FIG. 4B) on a display device inside the vehicle 100 that is within a line of vision of the driver as the driver is driving, such as the head-up display 410 or the dashboard display 420, to alert the driver that autonomous drive is available. As another example, in one embodiment, if the vehicle 100 is in the manual mode, the autonomous indicator unit 210 produces an audio alert (e.g., "Autonomous drive is available") via an audio device inside the vehicle 100 to alert the driver that autonomous drive is available. As yet another example, in one embodiment, the audio alert and the visual alert are used in combination to alert the driver that autonomous drive is available.

In one embodiment, if the vehicle 100 is in the manual mode and autonomous drive is available, the autonomous indicator unit 210 is configured to receive user input from the driver requesting to transition to autonomous drive. For example, in one embodiment, the driver presses and holds buttons/paddles positioned right below the thumb zone on the steering wheel to initiate autonomous drive. In response to receiving the user input, the autonomous indicator unit 210 is configured to trigger a manual to autonomous (MtA) handoff protocol to initiate handoff of control of the vehicle 100 from the driver. As described in detail later herein, the MtA handoff protocol involves the system 200 providing information to at least one I/O device 140 inside the vehicle 100 to alert the driver of the handoff and to guide the driver during the handoff of how to safely relinquish control of the vehicle 100.

In one embodiment, the system 200 comprises an autonomous supervisory unit 220 configured to monitor the vehicle 100 in autonomous drive and provide information related to the autonomous drive to at least one I/O device 140 inside the vehicle 100. Specifically, the autonomous supervisory unit 220 is configured to: (1) determine an autonomous confidence level for the vehicle 100 based on sensor data of the vehicle 100, wherein the autonomous confidence level is indicative of an estimated/predicted degree of confidence that the vehicle 100 can continue to drive autonomously, (2) determine countdown information indicative of an amount of distance and/or time remaining for continued operation of the vehicle 100 in the autonomous mode before the vehicle 100 stops operating in the autonomous mode, and (3) provide autonomous supervisory information to at least one I/O device 140 inside the vehicle 100, wherein the autonomous supervisory information includes an alert indicative of the autonomous confidence level and the countdown information.

In one embodiment, the system 200 provides autonomous supervisory information as a combination of one or more of the following: visual information, audio information, or haptic information. For example, in one embodiment, the system 200 displays one or more visual alerts (e.g., circular icon 520 in FIGS. 5A-5C) on a display device inside the vehicle 100, such as the dashboard display 420, the infotainment console 430, or a mobile electronic device, to alert the driver of an autonomous confidence level for the vehicle 100.

In one embodiment, an autonomous confidence level for the vehicle 100 is one of the following: a high autonomous confidence level indicative that there is high confidence the vehicle 100 can continue to drive autonomously and the driver will need to take over in the future but not anytime soon, a medium autonomous confidence level indicative that there is moderate confidence the vehicle 100 can continue to drive autonomously and the driver will need to take over soon, or a low autonomous confidence level indicative that there is low confidence the vehicle 100 can continue to drive autonomously and the driver will need to take over immediately.

In one embodiment, the autonomous supervisory unit 220 determines an autonomous confidence level for the vehicle 100 based on at least the following factors: location data, map data, velocity data, outside of vehicle data, and sensory quality data. For example, the autonomous supervisory unit 220 is configured to compare each factor against a corresponding pre-determined threshold for the factor, and determine whether the factor is under the corresponding pre-determined threshold. In one embodiment, the autonomous supervisory unit 220 determines a low autonomous confidence level for the vehicle 100 if at least one of the factors is under a corresponding pre-determined threshold. In another embodiment, the autonomous supervisory unit 220 determines a low autonomous confidence level for the vehicle 100 if all of the factors are under corresponding pre-determined thresholds.

In one embodiment, in response to determining a low autonomous confidence level for the vehicle 100, the autonomous supervisory unit 220 is configured to determine whether an amount of time remaining until the vehicle 100 can no longer safely drive autonomously exceeds a corresponding pre-determined threshold (e.g., 1 minute). If the amount of time remaining does not exceed the corresponding pre-determined threshold, the autonomous supervisory unit 220 is configured to trigger an autonomous to manual (AtM) handoff protocol to initiate handoff of control of the vehicle 100 to the driver. As described in detail later herein, the AtM handoff protocol involves the system 200 providing information to at least one I/O device 140 inside the vehicle 100 to alert the driver of the handoff and to guide the driver during the handoff of how to safely take over control of the vehicle 100. If the amount of time remaining exceeds the corresponding pre-determined threshold, the autonomous supervisory unit 220 is configured to delay triggering the AtM handoff protocol until the amount of time remaining equals or is less than the corresponding pre-determined threshold.

In one embodiment, the system 200 comprises an autonomous route planning unit 230 configured to: (1) receive as input, from the driver or a passenger of the vehicle, route planning data comprising a starting point, a destination point, and a first route between the starting point and the destination point, (2) determine whether the vehicle 100 can operate in the autonomous mode along the entirety of the first route or only along one or more portions of the first route based on sensor data of the vehicle 100, an autonomous confidence level for the vehicle 100, and the route planning data, and (3) provide autonomous route planning information to at least one I/O device 140 inside the vehicle 100, wherein the autonomous route planning information includes visual information and/or audio information indicative of whether the vehicle 100 can operate in the autonomous mode along the entirety of the first route or only along one or more portions of the first route.

In one embodiment, the autonomous route planning unit 230 is further configured to determine and recommend one or more alternative routes to the same destination point, wherein each alternative route includes one or more portions which the vehicle 100 can operate in the autonomous mode. The autonomous route planning information further includes additional visual information indicative of each alternative route and one or more portions of the alternative route which the vehicle 100 can operate in the autonomous mode. For example, in one embodiment, the autonomous indicator unit 210 overlays one or more visual alerts (e.g., overlays 531, 533 in FIG. 6B) on a dynamic map view of the vehicle 100 displayed on a display device inside the vehicle 100 (e.g., the navigation tab of the infotainment console 430, etc.), to alert the driver of one or more portions of a route which the vehicle 100 can operate in the autonomous mode. The driver can select the first route or an alternative route to navigate the vehicle 100 to the destination point. For example, if an alternative route has a total travel time that is longer than the first route, the driver may select the alternative route as the alternative route may have more portions which the vehicle 100 can operate in the autonomous mode.

In one embodiment, the system 200 comprises a mode change unit 240 configured to adjust a UI/UX design for the vehicle 100 in response to the vehicle 100 transitioning between the autonomous mode and the manual mode. In one embodiment, in response to the system 200 triggering the AtM handoff protocol to initiate handoff of control of the vehicle 100 to the driver, the mode change unit 240 is configured to adapt a UI/UX design for the vehicle 100 to reflect the transition and increase cognitive awareness (i.e., increase attention) of the driver to the handoff. As described in detail later herein, the mode change unit 240 provides AtM handoff warning information to at least one I/O device 140 inside the vehicle 100, wherein the AtM handoff warning information includes a sequence of alerts that notify the driver of the handoff and guide the driver during the handoff of how to safely take over control of the vehicle 100. The AtM handoff warning information is provided as a combination of one or more of the following: visual information, audio information, or haptic information.

In one embodiment, in response to the system 200 triggering the MtA handoff protocol to initiate handoff of control of the vehicle 100 from the driver, the mode change unit 240 is configured to adapt a UI/UX design for the vehicle 100 to reflect the transition. As described in detail later herein, the mode change unit 240 provides MtA handoff warning information to at least one I/O device 140 inside the vehicle 100, wherein the MtA handoff warning information includes a sequence of alerts that notify the driver of the handoff and guide the driver during the handoff of how to safely relinquish control of the vehicle 100. The MtA handoff warning information is provided as a combination of one or more of the following: visual information, audio information, or haptic information.

For example, in one embodiment, the mode change unit 240 is configured to determine which display device inside the vehicle 100 the driver is looking at based on sensor data relating to the driver, and displays a visual alert on the display device to alert the driver of a handoff of control of the vehicle 100. In one embodiment, the mode change unit 240 is configured to determine which display device inside the vehicle 100 the driver is looking at using data from interior facing cameras, eye tracking technology, etc. For example, if the driver is looking at a mobile electronic device, the mode change unit 240 provides the visual alert for display on the mobile electronic device over a wireless connection (e.g., Bluetooth). As another example, if the driver is viewing infotainment on the infotainment console 430, the mode change unit 240 interrupts/pauses playback of the infotainment and overlays the visual alert on the infotainment.

As another example, in one embodiment, the mode change unit 240 is configured to determine wherein an interior environment of the vehicle 100 is suitable for an audio alert (e.g., quiet enough) based on sensor data relating to the driver and of the vehicle 100. In one embodiment, the mode change unit 240 is configured to determine whether the interior environment is suitable using data from interior microphones, etc. In response to determining the interior environment of the vehicle 100 is suitable for an audio alert, the mode change unit 240 produces an audio alert via an audio device inside the vehicle 100 to alert the driver of a handoff of control of the vehicle 100.

As another example, in one embodiment, the mode change unit 240 is configured to produce a haptic alert via a haptic feedback device inside the vehicle 100 to alert the driver of a handoff of control of the vehicle 100. For example, the mode change unit 240 produces vibrations in a component of the vehicle 100 that the driver is physically in contact with, such as the driver seat, the steering wheel, or a mobile electronic device inside the vehicle 100.

As another example, in one embodiment, the mode change unit 240 is configured to adjust interior lighting inside the vehicle 100 to increase cognitive awareness (i.e., increase attention) of the driver to a handoff of control of the vehicle 100. For example, the mode change unit 240 increases brightness/intensity of one or more lights and/or display devices inside the vehicle 100. As another example, the mode change unit 240 switches to using warm/active colors (e.g., red) for ambient lighting inside the vehicle.

In one embodiment, the system 200 is configured to leverage one or more components of a hardware and/or software platform for advanced driver assistance system (e.g., a component that provides a framework for monitoring all objects in and around an environment of the vehicle 100) to provide autonomous indicator information, autonomous supervisory information, autonomous route planning information, and/or handoff warning information. For example, in one embodiment, the system 200 is configured to leverage one or more components of the Samsung® DRVLINE™ technology, such as the World Model Manager and the Fusion Manager (for organizing raw camera data captured by one or more cameras), to provide autonomous indicator information, autonomous supervisory information, autonomous route planning information, and/or handoff warning information.

Figure 4A:
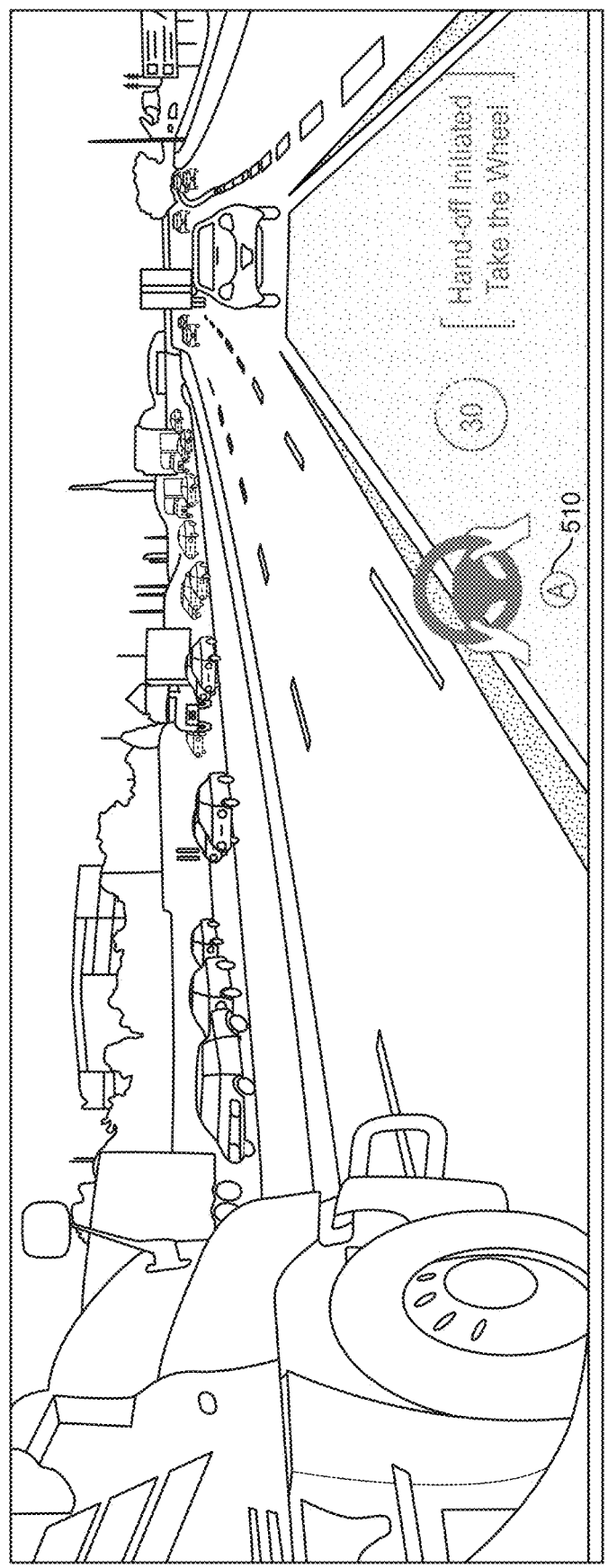
FIG. 4A illustrates example autonomous indicator information displayed on a head-up display inside a vehicle in the autonomous mode, in accordance with an embodiment.

FIG. 4A illustrates example autonomous indicator information displayed on a head-up display 410 inside a vehicle 100 in the autonomous mode, in accordance with an embodiment. In one embodiment, the system 200 displays a visual alert comprising a dynamic autonomous indicator 510 on the head-up display 410. As shown in FIG. 4A, in one embodiment, the autonomous indicator 510 comprises an icon of the letter "A". If autonomous drive is available for the vehicle 100, the autonomous indicator 510 is displayed (or illuminated), as shown in FIG. 4A; otherwise, the autonomous indicator 510 is not displayed (or dimmed).

Figure 4B:
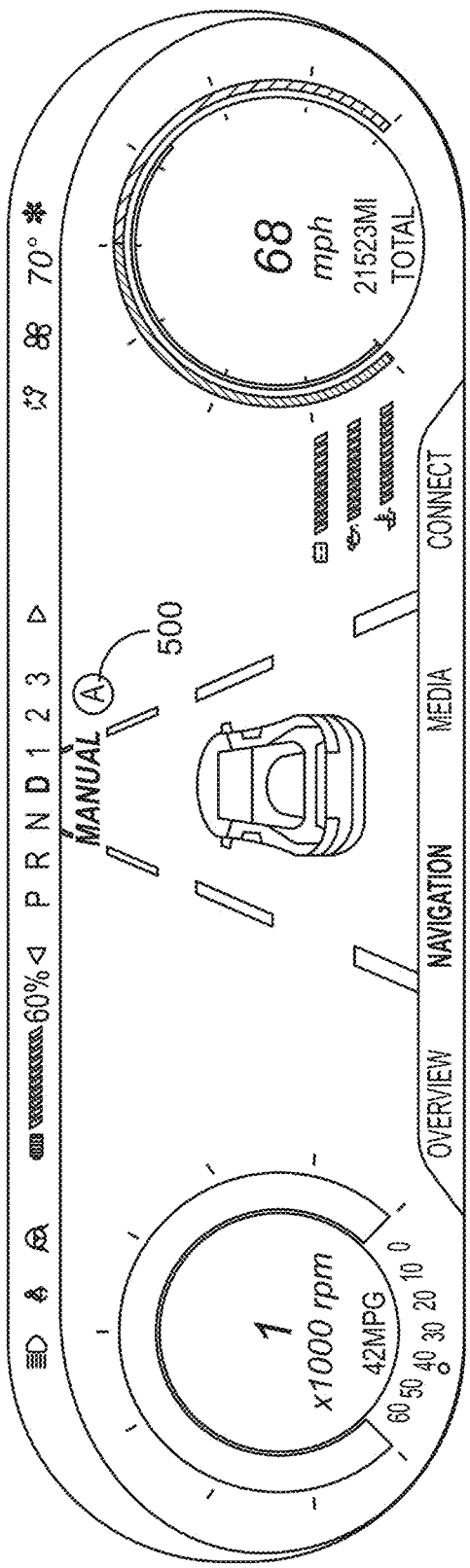
FIG. 4B illustrates example autonomous indicator information displayed on a dashboard display inside a vehicle in the manual mode, in accordance with an embodiment.

FIG. 4B illustrates example autonomous indicator information displayed on a dashboard display 420 inside a vehicle 100 in the manual mode, in accordance with an embodiment. In one embodiment, if a head-up display 410 is not available inside the vehicle 100, the system 200 displays a visual alert comprising a dynamic autonomous indicator 500 on another display device that is within a line of vision of a driver of the vehicle 100, such as the dashboard display 420. As shown in FIG. 4B, in one embodiment, the autonomous indicator 500 comprises an icon of the letter "A". If autonomous drive is available for the vehicle 100, the autonomous indicator 500 is illuminated (or displayed); otherwise, the autonomous indicator 500 is dimmed (or not displayed), as shown in FIG. 4B.

In one embodiment, the system 200 is configured to display autonomous indicator information on another display device inside the vehicle 100, such as on a navigation tab 582 (FIG. 9A) of the infotainment console 430 or an existing navigation system inside the vehicle 100. In one embodiment, the system 200 is configured to display autonomous indicator information on another component of the vehicle 100 that is within a line of vision of the driver, such as on a steering wheel using a light indicator or an icon display.

Figure 5A:
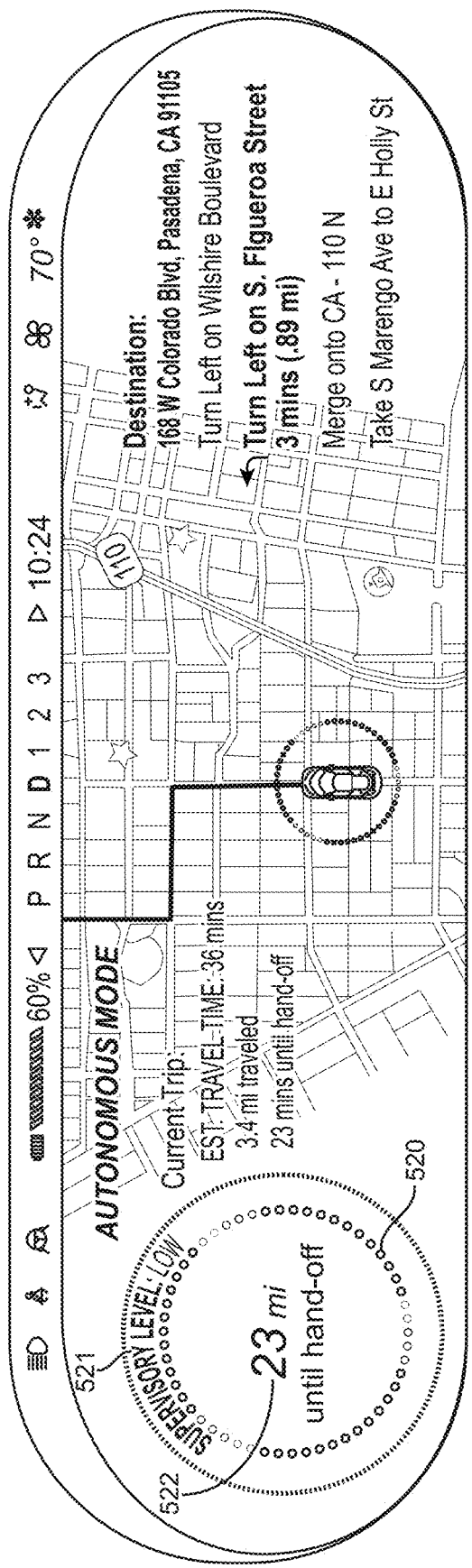
FIG. 5A illustrates example autonomous supervisory information displayed on a dashboard display inside a vehicle to indicate a high autonomous confidence level, in accordance with an embodiment.
Figure 5B:
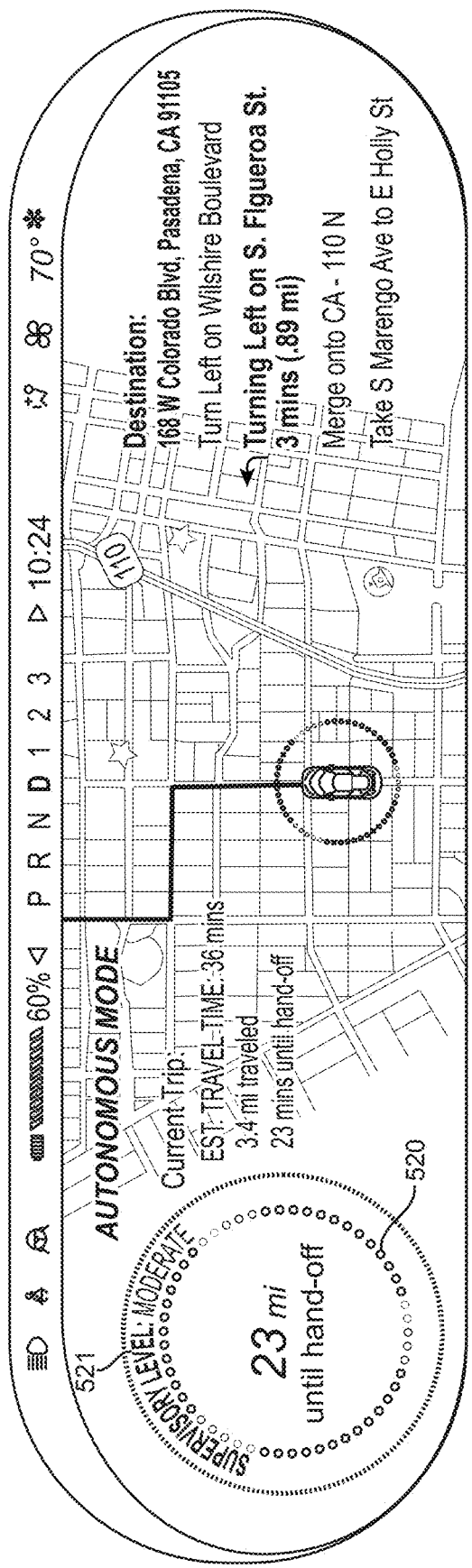
FIG. 5B illustrates example autonomous supervisory information displayed on a dashboard display inside a vehicle to indicate a medium autonomous confidence level, in accordance with an embodiment.
Figure 5C:
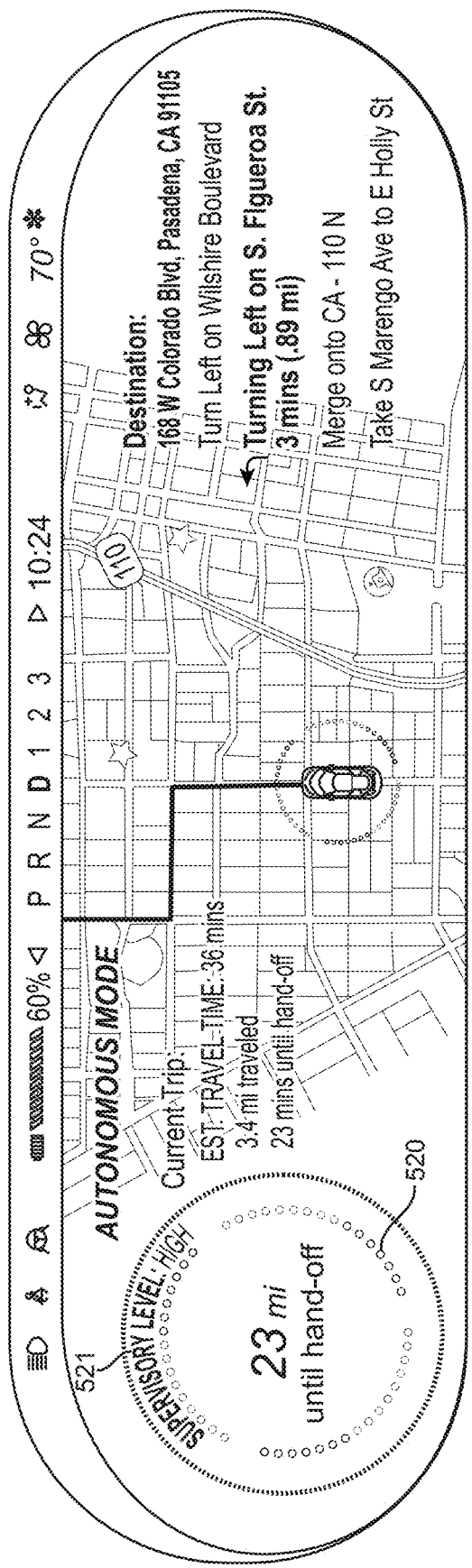
FIG. 5C illustrates example autonomous supervisory information displayed on a dashboard display inside a vehicle to indicate a low autonomous confidence level, in accordance with an embodiment.

FIGS. 5A-5C each illustrate example autonomous supervisory information displayed on a dashboard display 420 inside a vehicle 100 in the autonomous mode, in accordance with an embodiment. Specifically, FIG. 5A illustrates example autonomous supervisory information displayed on the dashboard display 420 to indicate a high autonomous confidence level, in accordance with an embodiment. FIG. 5B illustrates example autonomous supervisory information displayed on the dashboard display 420 to indicate a medium autonomous confidence level, in accordance with an embodiment. FIG. 5C illustrates example autonomous supervisory information displayed on the dashboard display 420 to indicate a low autonomous confidence level, in accordance with an embodiment. In one embodiment, the system 200 displays a visual alert comprising a dynamic circular icon 520 on the dashboard display 420 to alert a driver of the vehicle 100 of an autonomous confidence level. In one embodiment, the circular icon 520 changes color as the autonomous confidence level changes. For example, if the autonomous confidence level is high (i.e., good), the circular icon 520 is displayed in a first color, such as a cool color or a passive color (e.g., green). If the autonomous confidence level is medium (i.e., moderate), the circular icon 520 is displayed in a second color that is different from the first color, such as a warm color or an active color (e.g., yellow). If the autonomous confidence level is low, the circular icon 520 is displayed in a third color that is different from the first color and the second color, such as a warmer color or a more active color (e.g., red). The color of the circular icon 520 changes from a cool/passive color to a warm/active color as the autonomous confidence level decreases to increase a likelihood that the driver of the vehicle 100 is alerted to the change in the autonomous confidence level. For example, displaying the circular icon 520 in the second color (e.g., yellow) cautions the driver that soon the vehicle 100 can no longer safely drive autonomously, and displaying the circular icon 520 in the third color (e.g., red) alerts the drive to immediately take over driving of the vehicle 100 (i.e., autonomous drive is unavailable).

In one embodiment, the system 200 displays a different visual alert comprising a supervisory level label 521 indicative of a degree/level of supervision required from the driver, wherein the supervisory level label 521 is positioned within proximity of the circular icon 520 (e.g., directly above the circular icon 520). For example, in one embodiment, if the autonomous confidence level is high, the supervisory level label 521 displayed is "Supervisory Level: Low" indicative that there is high confidence that the vehicle 100 can drive autonomously and that the driver will need to take over in the future but not anytime soon, as shown in FIG. 5A. If the autonomous confidence level is medium, the supervisory level label 521 displayed is "Supervisory Level: Moderate" indicative that there is moderate confidence that the vehicle 100 can drive autonomously and that the driver will need to take over soon, as shown in FIG. 5B. If the autonomous confidence level is low, the supervisory level label 521 displayed is "Supervisory Level: High" indicative that there is low confidence that the vehicle 100 can drive autonomously and that the driver will need to take over immediately, as shown in FIG. 5C.

In one embodiment, a portion of the supervisory level label 521 changes color as the autonomous confidence level changes to match the color of the circular icon 520. For example, if the autonomous confidence level is low, the word "Low" included in the supervisory level label 521 is displayed in the first color. If the autonomous confidence level is medium, the word "Medium" included in the supervisory level label 521 is displayed in the second color. If the autonomous confidence level is high, the word "High" included in the supervisory level label 521 is displayed in the third color.

In one embodiment, the circular icon 520 includes a dynamic countdown timer 522. In one embodiment, if the vehicle 100 is in the autonomous mode and the AtM handoff protocol is not triggered, the countdown timer 522 displays distance countdown information indicative of an amount of distance (e.g., mileage) remaining for continued operation of the vehicle 100 in the autonomous mode before the vehicle 100 can no longer drive autonomously (i.e., the vehicle 100 transitions to the manual mode and a driver of the vehicle 100 must take over). If the vehicle 100 is in the autonomous mode and the AtM handoff protocol is triggered, the countdown timer 522 displays time countdown information indicative of an amount of time (e.g., seconds) remaining before the autonomous mode ends.

In one embodiment, the system 200 is configured to display autonomous supervisory information on another display device inside the vehicle 100, such as on a navigation tab 582 (FIG. 9E) of the infotainment console 430 or an existing navigation system inside the vehicle 100.

Figure 6A:
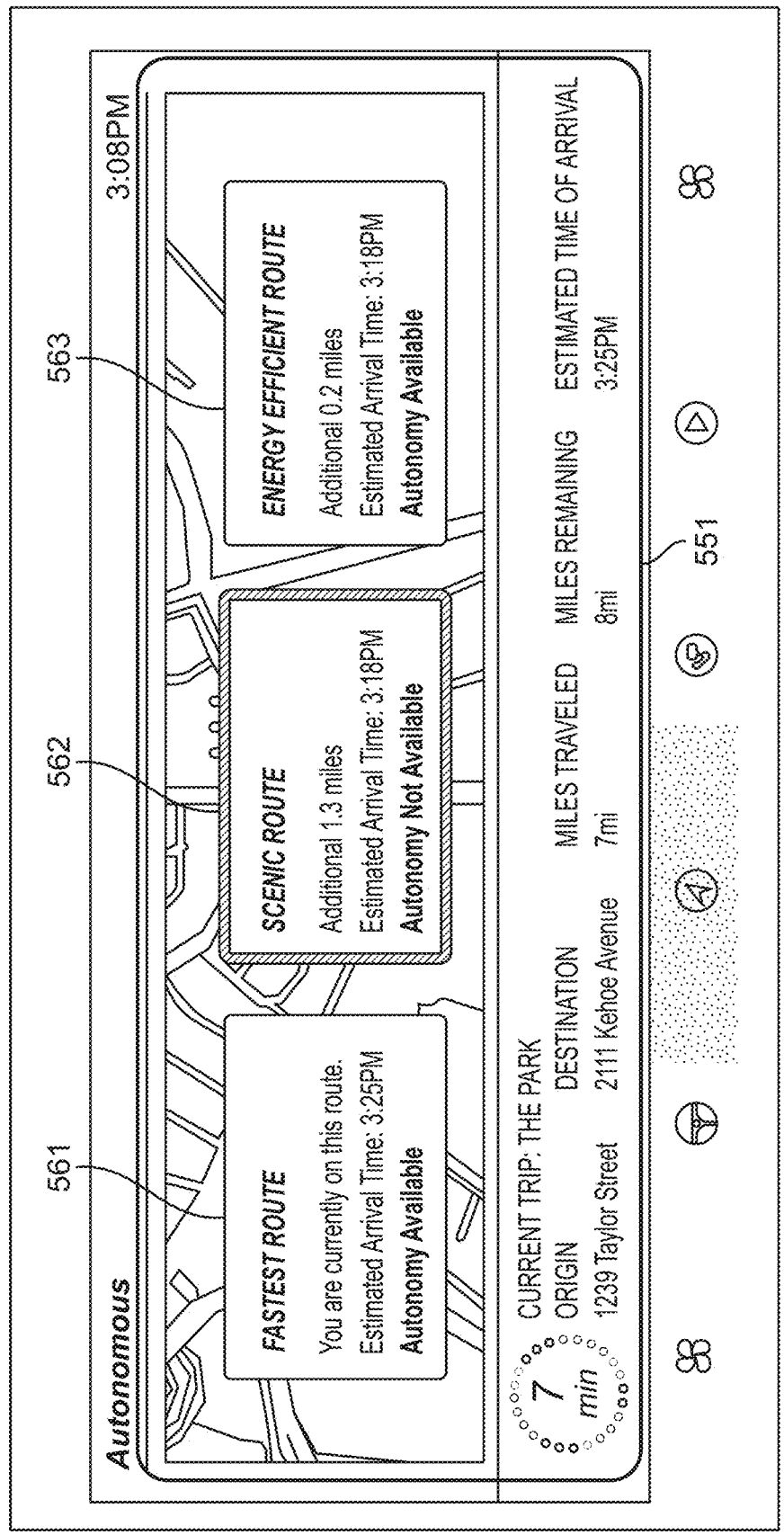
FIG. 6A illustrates an example autonomous route planning information displayed on an infotainment console inside a vehicle to indicate different available routes to a destination point, in accordance with an embodiment.
Figure 6B:
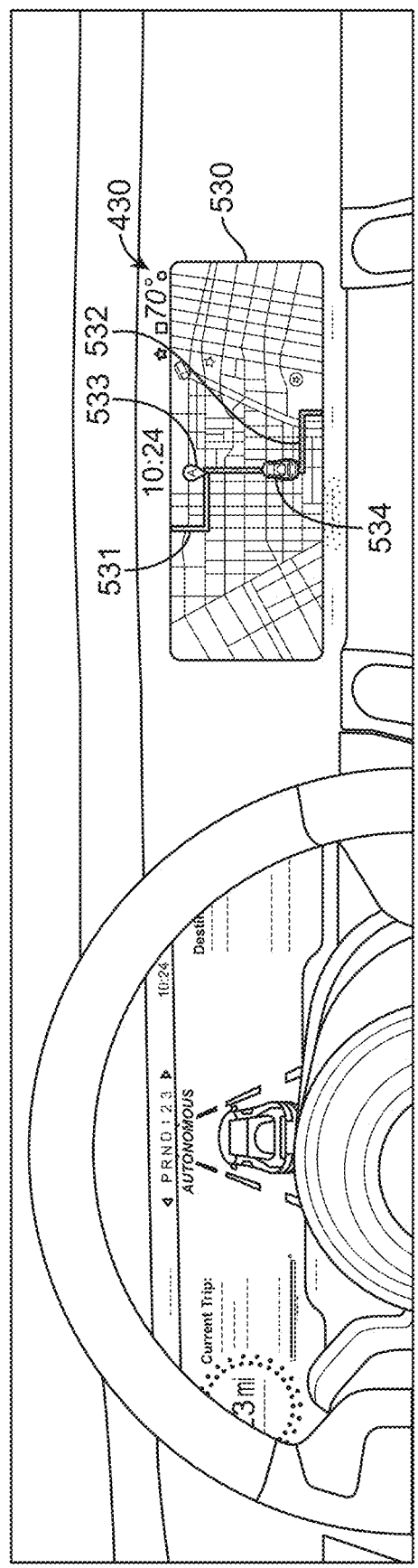
FIG. 6B illustrates an example autonomous route planning information displayed on an infotainment console inside a vehicle to indicate one or more portions of a route which the vehicle can operate in the autonomous mode, in accordance with an embodiment.
Figure 6C:
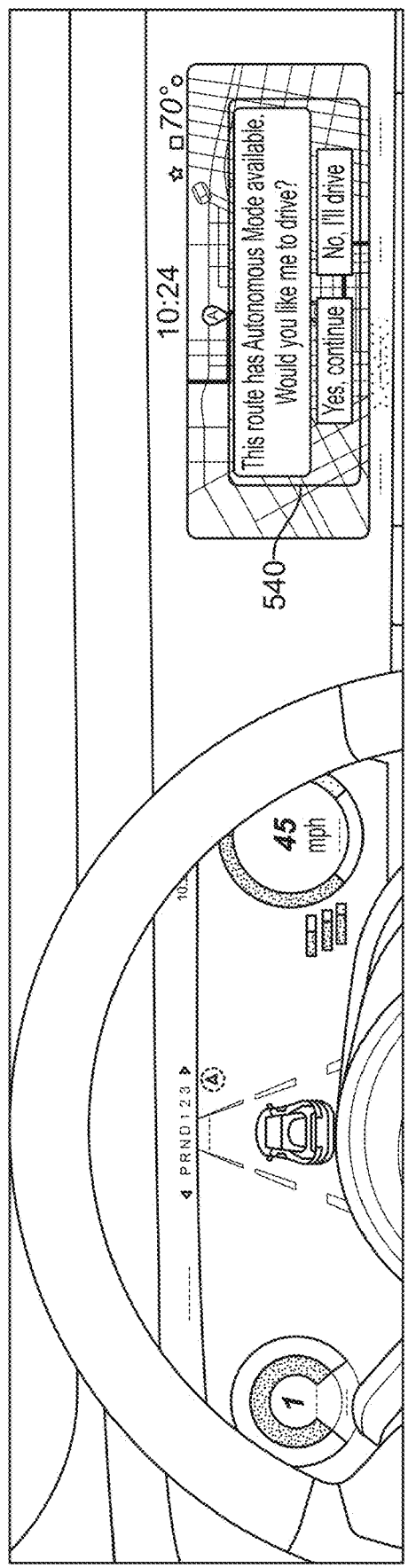
FIG. 6C illustrates an example autonomous route planning information displayed on an infotainment console inside a vehicle to indicate that the autonomous mode is now available, in accordance with an embodiment.

FIGS. 6A-6C each illustrate example autonomous route planning information displayed on an infotainment console 430 inside a vehicle 100, in accordance with an embodiment. Specifically, FIG. 6A illustrates an example autonomous route planning information displayed on the infotainment console 430 to indicate different available routes to a destination point, in accordance with an embodiment. In one embodiment, the system 200 displays route planning data 551 for a current trip on a navigation tab 582 (FIG. 9E) of the infotainment console 430. As shown in FIG. 6A, in one embodiment, the route planning data displayed includes a starting point ("ORIGIN"), a destination point ("DESTINATION"), an estimated time of arrival at the destination point ("ESTIMATED TIME OF ARRIVAL"), an amount of distance traveled so far ("MILES TRAVELED"), a remaining amount of distance to travel to reach the destination point ("MILES REMAINING"), and a dynamic map view of the vehicle 100. In one embodiment, the autonomous route planning unit 230 overlays the route planning data 551 with different selectable notifications indicative of different available routes to the destination point. For example, as shown in FIG. 6A, the different selectable notifications include: (1) a first selectable notification 561 indicative of a fastest route ("FASTEST ROUTE") to the destination point, (2) a second selectable notification 562 indicative of a first alternative route/scenic route ("SCENIC ROUTE") to the destination point, and (3) a third selectable notification 563 indicative of a second alternative route/energy efficient route ("ENERGY EFFICIENT ROUTE") to the destination point. Each selectable notification 561-563 includes additional information relating to a route that the notification is indicative of, such as whether autonomous drive is available on the route ("Autonomy Available", "Autonomy Not Available"), an estimated time of arrival at the destination point if the vehicle 100 takes this route ("Estimated Arrival Time"), an indication that the vehicle 100 is currently traveling on the route if applicable ("You are currently on this route"), and an additional amount of distance that the vehicle 100 will travel if the vehicle 100 takes this route (as compared to the fastest route) if applicable. As shown in FIG. 6A, compared to the fastest route and the energy efficient route, the scenic route requires the most amount of distance to travel to reach the destination point.

FIG. 6B illustrates an example autonomous route planning information displayed on the infotainment console 430 to indicate one or more portions of a route which the vehicle 100 can operate in the autonomous mode, in accordance with an embodiment. In one embodiment, in response to user selection of a selectable notification indicative of an available route 532 (e.g., the fastest route, the energy efficient route, the scenic route) to the destination point, the system 200 displays a dynamic map view 530 of the route 532 in the navigation tab 582 (FIG. 9E) on the infotainment console 430. As shown in FIG. 6B, the dynamic map view 530 includes a dynamic vehicle icon 534 representing the vehicle 100. As the vehicle 100 drives towards a destination point, the vehicle icon 534 moves accordingly along the route 532. As shown in FIG. 6B, a portion 531 of the route 532 comprises an overlay of a different color to indicate that the vehicle 100 can operate in the autonomous mode along this portion 531. In one embodiment, an overlay of an autonomous icon 533 is positioned at a point along the route 532 to indicate where the vehicle 100 can begin operating in the autonomous mode. As shown in FIGS. 6B-6C, in one embodiment, the autonomous icon 533 comprises an icon of the letter "A".

FIG. 6C illustrates an example autonomous route planning information displayed on the infotainment console 430 to indicate that the autonomous mode is now available, in accordance with an embodiment. As shown in FIG. 6C, when the vehicle 100 reaches the point along the route 532 where the autonomous icon 533 is positioned, the system 200 overlays a notification 540 on the dynamic map view 530 to notify the driver that the autonomous mode is now available. In one embodiment, at least one of the following visual alerts is also displayed simultaneously with the notification 540: the autonomous indicator 500 (FIG. 4B) is illuminated on the dashboard display 420, or the autonomous indicator 510 (FIG. 4A) is displayed on the head-up display 410.

As shown in FIG. 6C, the notification 540 further prompts the driver to select one of the following: to continue operation of the vehicle 100 in the manual mode, or to transition to the autonomous mode.

In one embodiment, the system 200 is configured to display autonomous route planning information on another display device inside the vehicle 100, such as the dashboard display 420 or an existing navigation system inside the vehicle 100.

Figure 7A:
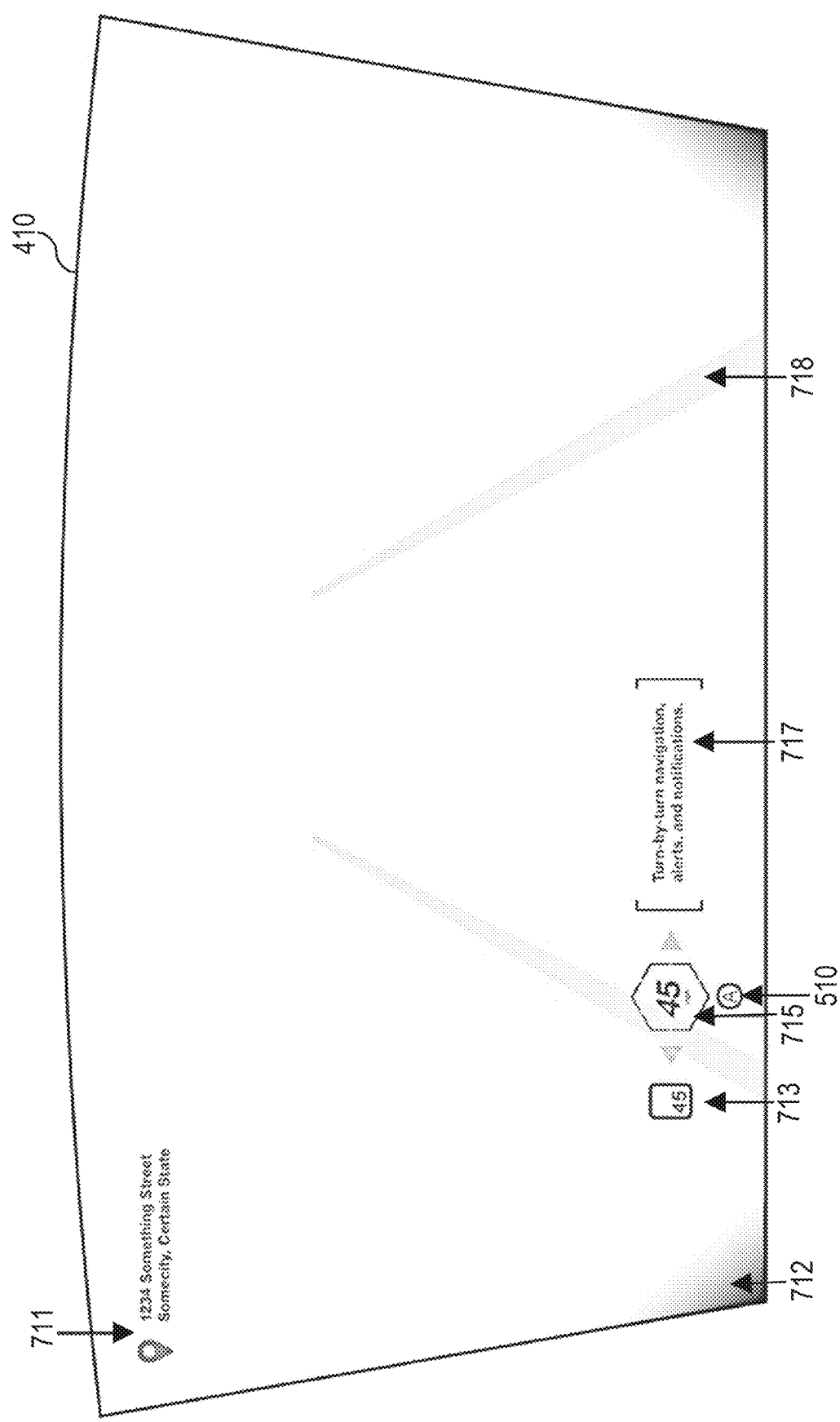
FIG. 7A illustrates examples of different alerts displayed on a head-up display inside a vehicle, in accordance with an embodiment.

FIG. 7A illustrates examples of different alerts displayed on a head-up display 410 inside a vehicle 100, in accordance with an embodiment. As shown in FIG. 7A, in one embodiment, the system 200 is configured to selectively display at least one of the following on the head-up display 410 based on a state of the vehicle 100: (1) an alert 717 indicative of turn-by-turn navigation and/or road conditions of a roadway the vehicle 100 is on (e.g., snow on the roadway), (2) an alert 713 indicative of local signage (e.g., a speed limit traffic sign), (3) an alert 715 indicative of current speed of the vehicle 100 and status of turn signal indicator lights of the vehicle 100 (e.g., whether left turn signal is activated, whether right turn signal is activated), (4) an alert 711 indicative of current location of the vehicle 100, (5) one or more lane assist notifications 718 indicative of one or more lane markings on the roadway, (6) one or more ambient blind spot alerts 712 indicative of one or more blind spots (i.e., blind spots on the left side and the right side of the vehicle 100), and (7) an autonomous indicator 510 (displayed only if autonomous drive is available for the vehicle 100). The system 200 is configured to display on the head-up display 410 alerts for other features related to vehicle safety and improved driving, such as obstacle detection, lane flow indicators, etc.

Figure 7B:
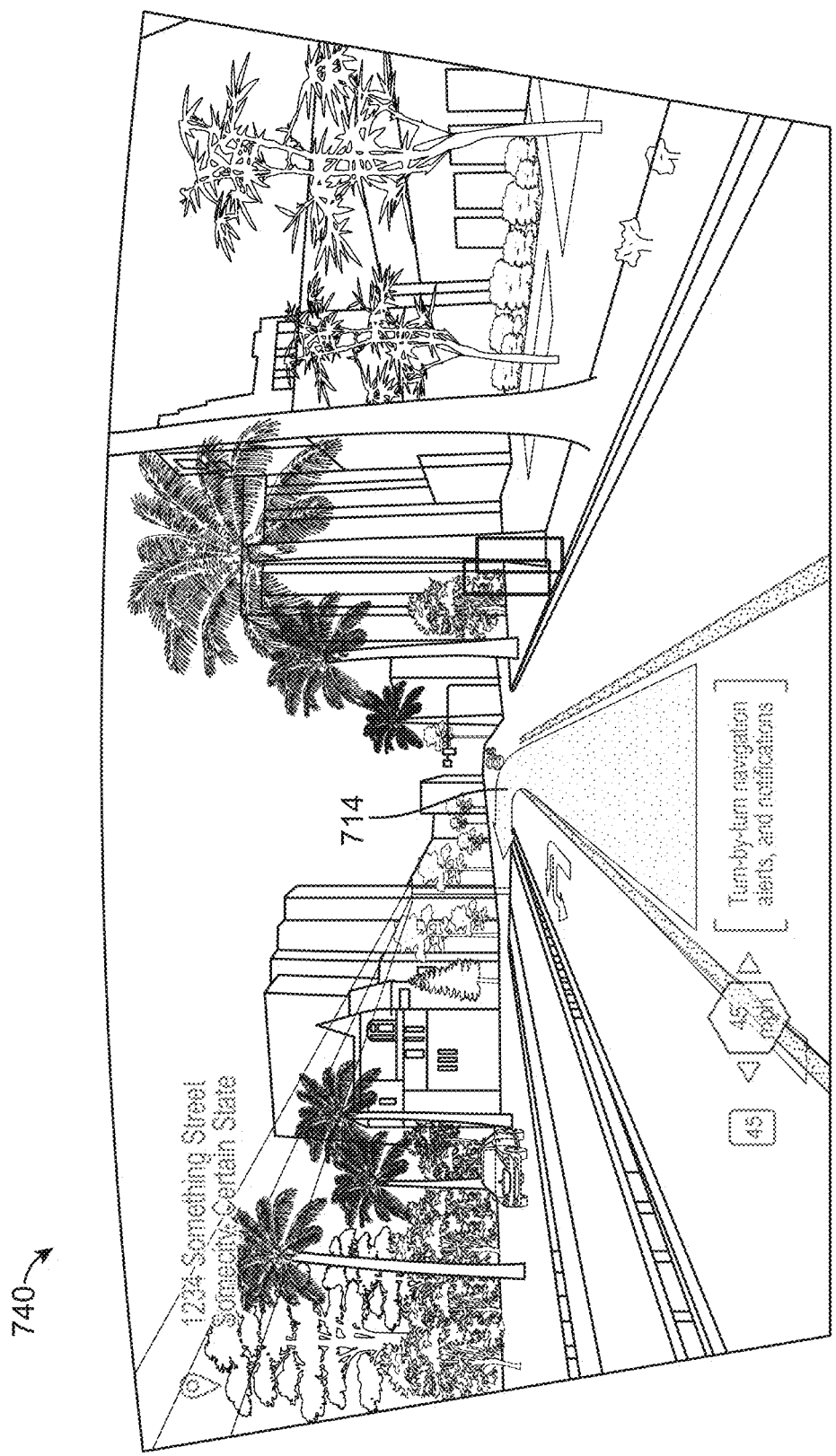
FIG. 7B illustrates an example UI displayed on a head-up display inside a vehicle in the manual mode, in accordance with an embodiment.

FIG. 7B illustrates an example UI 740 displayed on a head-up display 410 inside a vehicle 100 in the manual mode, in accordance with an embodiment. In one embodiment, if the vehicle 100 is in the manual mode, the system 200 is configured to display on the head-up display 410 a UI 740 comprising environmental in view information that is immediately relevant to a driver of the vehicle 100 for vehicle safety and improved driving. For example, the environmental in view information included in the UI 740 comprises, but is not limited to, a navigation indicator 714 indicative of a direction the driver should follow as the driver drives the vehicle 100.

Figure 7C:
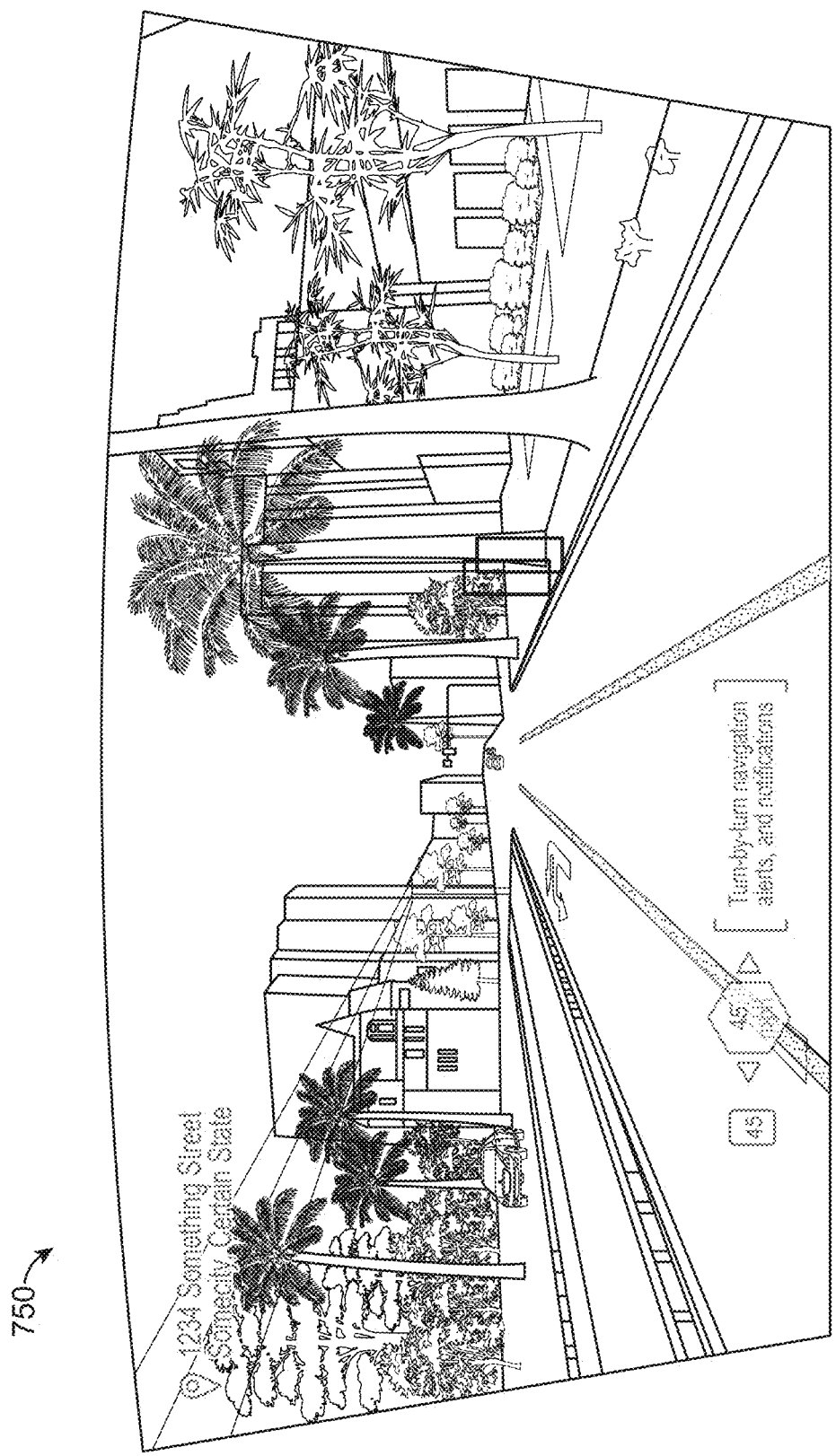
FIG. 7C illustrates an example UI displayed on a head-up display inside a vehicle in the autonomous mode, in accordance with an embodiment.

FIG. 7C illustrates an example UI 750 displayed on a head-up display 410 inside a vehicle 100 in the autonomous mode, in accordance with an embodiment. In one embodiment, if the vehicle 100 is in the autonomous mode, the system 200 is configured to display on the head-up display 410 a UI 750 comprising environmental in view information that is passive (i.e., not immediately relevant to a driver of the vehicle 100). For example, unlike the UI 740 in FIG. 7B, the UI 750 does not include a navigation indicator 714 as the vehicle 100 is in autonomous drive.

Figure 8A:
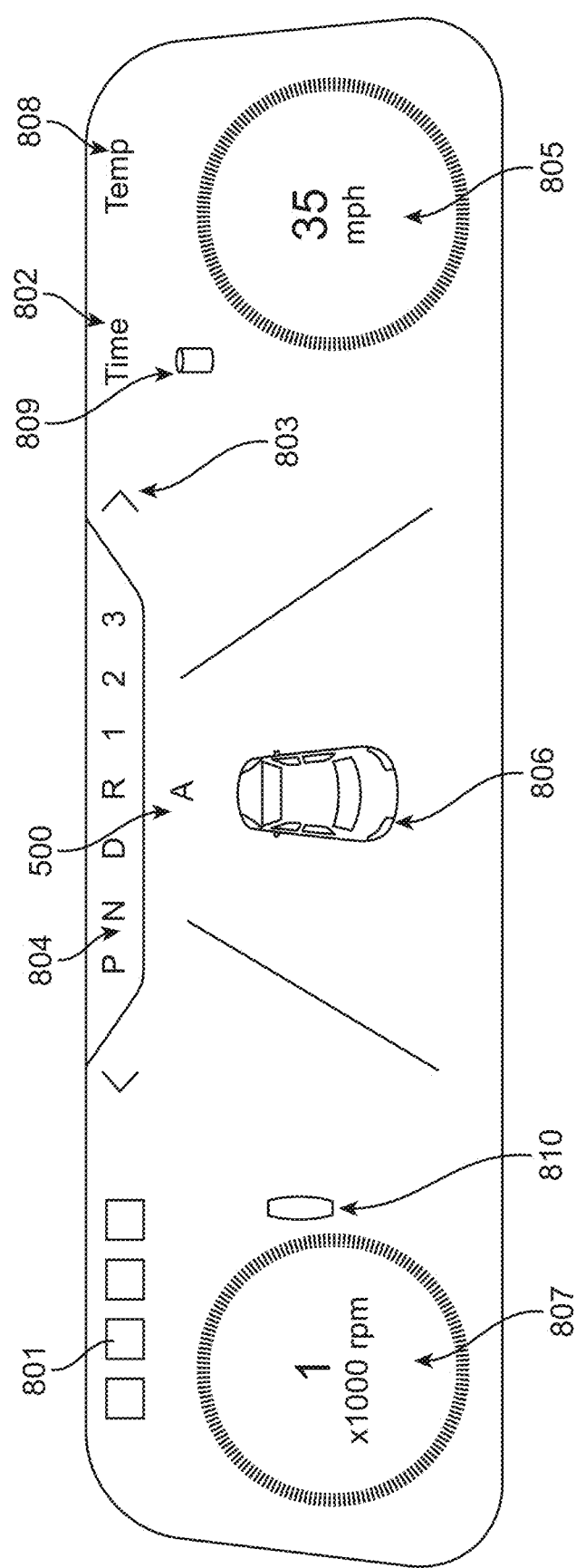
FIG. 8A illustrates examples of different alerts displayed on a dashboard display inside a vehicle in the manual mode, in accordance with an embodiment.

FIG. 8A illustrates examples of different alerts displayed on a dashboard display 420 inside a vehicle 100 in the manual mode, in accordance with an embodiment. As shown in FIG. 8A, in one embodiment, if the vehicle 100 is in the manual mode, the system 200 is configured to display at least one of the following on the dashboard display 420: (1) a set of warning lights 801 (e.g., brake warning light, temperature warning light, oil warning light, battery warning light), (2) a gear shift position indicator 804 indicative of a current gear shift of the vehicle 100 (e.g., park, drive, neutral, etc.), (3) an autonomous indicator 500 (displayed or illuminated only when autonomous drive is available for the vehicle 100), (4) a set of turn indicators 803 indicative of status of turn signal indicator lights of the vehicle 100 (e.g., whether left turn signal is activated, whether right turn signal is activated), (5) a clock indicator 802 indicative of a current time, (6) a temperature indicator 808 indicative of a current temperature at a current location of the vehicle 100, (7) a gas/fuel/charge indicator 809 indicative of amount of gas/fuel/charge (e.g., battery charge, electricity charge) remaining in the vehicle 100 for travel, (8) a dynamic map view 806 of the vehicle 100, (9) a vehicle temperature indicator 810 indicative of a current temperature of the vehicle 100, (10) a speed gauge 805 indicative of current speed of the vehicle 100, or (11) a revolutions per minute (RPM) gauge 807 indicative of a current RPM of the vehicle 100. In one embodiment, if the vehicle 100 is in the manual mode, the system 200 is further configured to display on the dashboard display 420 alerts for other features related to vehicle safety and improved driving, such as obstacle detection, etc.

Figure 8B:
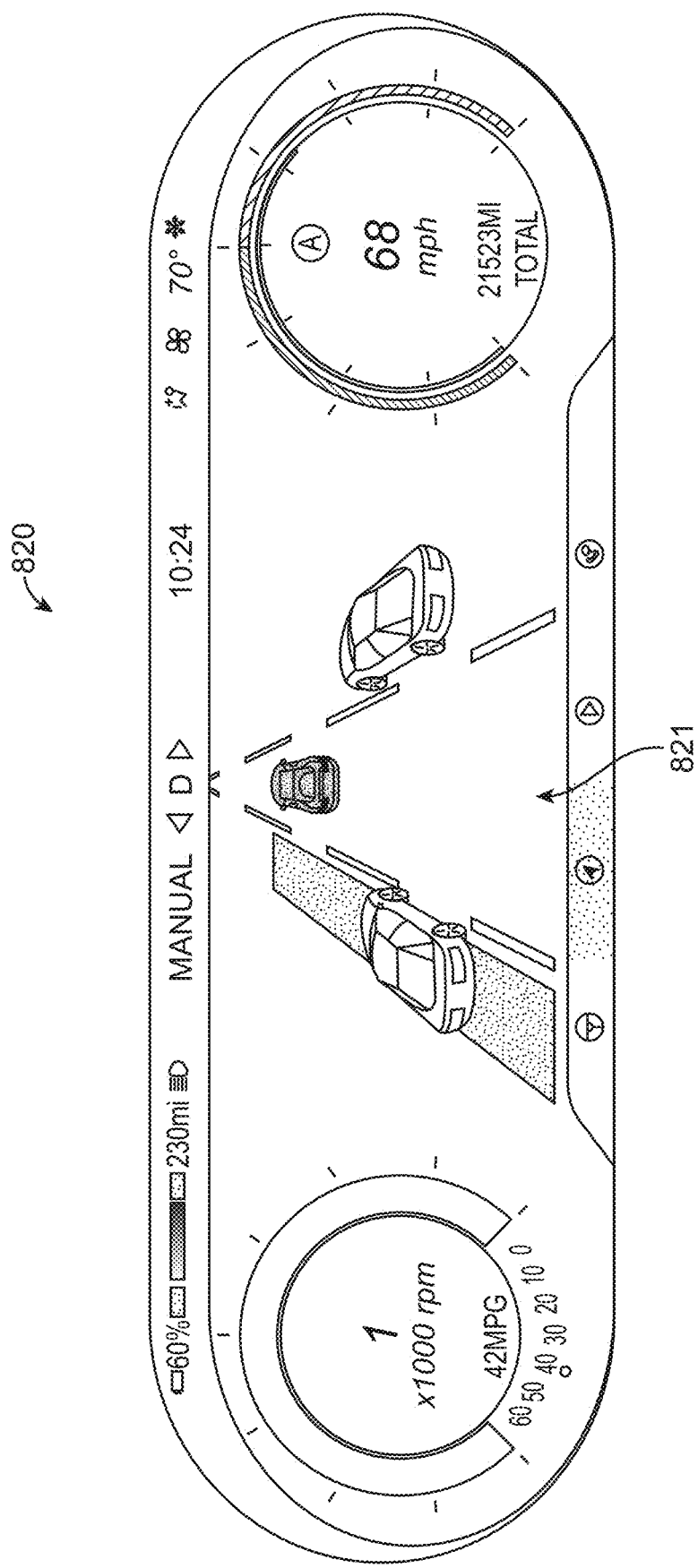
FIG. 8B illustrates an example UI displayed on a dashboard display inside a vehicle in the manual mode, in FIG. 8C illustrates another example UI displayed on a dashboard display inside a vehicle in the manual mode, in accordance with an embodiment.

FIG. 8B illustrates an example UI 820 displayed on a dashboard display 420 inside a vehicle 100 in the manual mode, in accordance with an embodiment. In one embodiment, if the vehicle 100 is in the manual mode, the system 200 is configured to display on the dashboard display 420 a UI 820 comprising vehicle status and diagnostics information that is immediately relevant to a driver of the vehicle 100 for vehicle safety and improved driving such as, but not limited to, a dynamic map view 821 of the vehicle 100. Based on sensor data of the vehicle 100, the dynamic map view 821 is indicative of obstacles and other potential safety issues in an environment surrounding the vehicle 100, such as blind spots, lanes, other vehicles merging onto the same lane as the vehicle 100, objects behind the vehicle 100, etc. For example, as shown in FIG. 8B, if the system 200 detects based on the sensor data that another vehicle is approaching the vehicle 100 from behind, the system 200 automatically adjusts the dynamic map view 821 to show a bird's eye view of the vehicle 100 (i.e., a view of the vehicle 100 from overhead) so that the driver can view objects behind the vehicle 100.

Figure 8C:
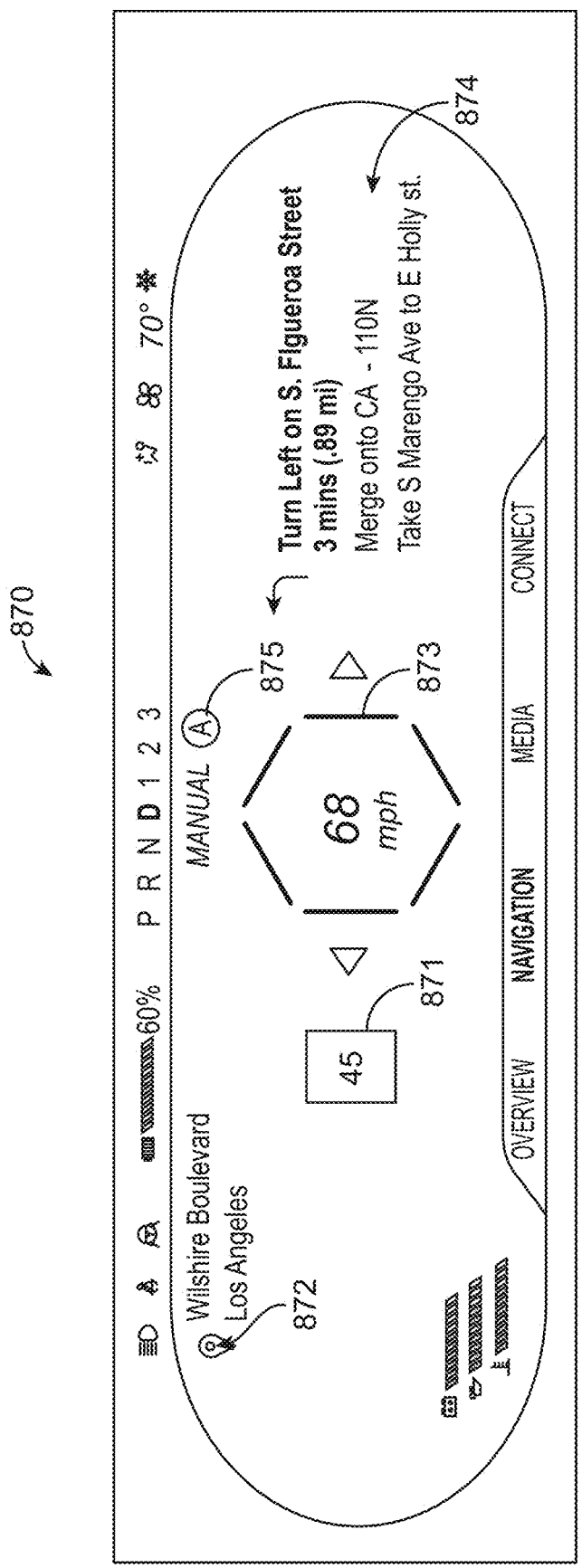
FIG. 8D illustrates examples of different alerts displayed on a dashboard display inside a vehicle in the autonomous mode, in accordance with an embodiment.
FIG. 8E illustrates an example UI displayed on a dashboard display inside a vehicle in the autonomous mode, in accordance with an embodiment.

FIG. 8C illustrates another example UI 870 displayed on a dashboard display 420 inside a vehicle 100 in the manual mode, in accordance with an embodiment. In one embodiment, if a head-up display 410 is not available inside the vehicle 100, the system 200 is configured to display environmental in view information that is immediately relevant to a driver of the vehicle 100 for vehicle safety and improved driving on another display device that is within a line of vision of the driver, such as the dashboard display 420. For example, as shown in FIG. 8C, if the vehicle 100 is in the manual mode, the system 200 is configured to display on the dashboard display 420 a UI 870 comprising both vehicle status and diagnostics information and environmental in view information such as, but not limited to, an alert 871 indicative of local signage (e.g., a speed limit traffic sign), an alert 872 indicative of current location of the vehicle 100, an alert 873 indicative of current speed of the vehicle 100 and status of turn signal indicator lights of the vehicle 100 (e.g., whether left turn signal is activated, whether right turn signal is activated), an alert 874 indicative of turn-by-turn navigation and/or road conditions of a roadway the vehicle 100 is on (e.g., snow on the roadway), or an autonomous indicator 875 (displayed only if autonomous drive is available for the vehicle 100).

Figure 8D:
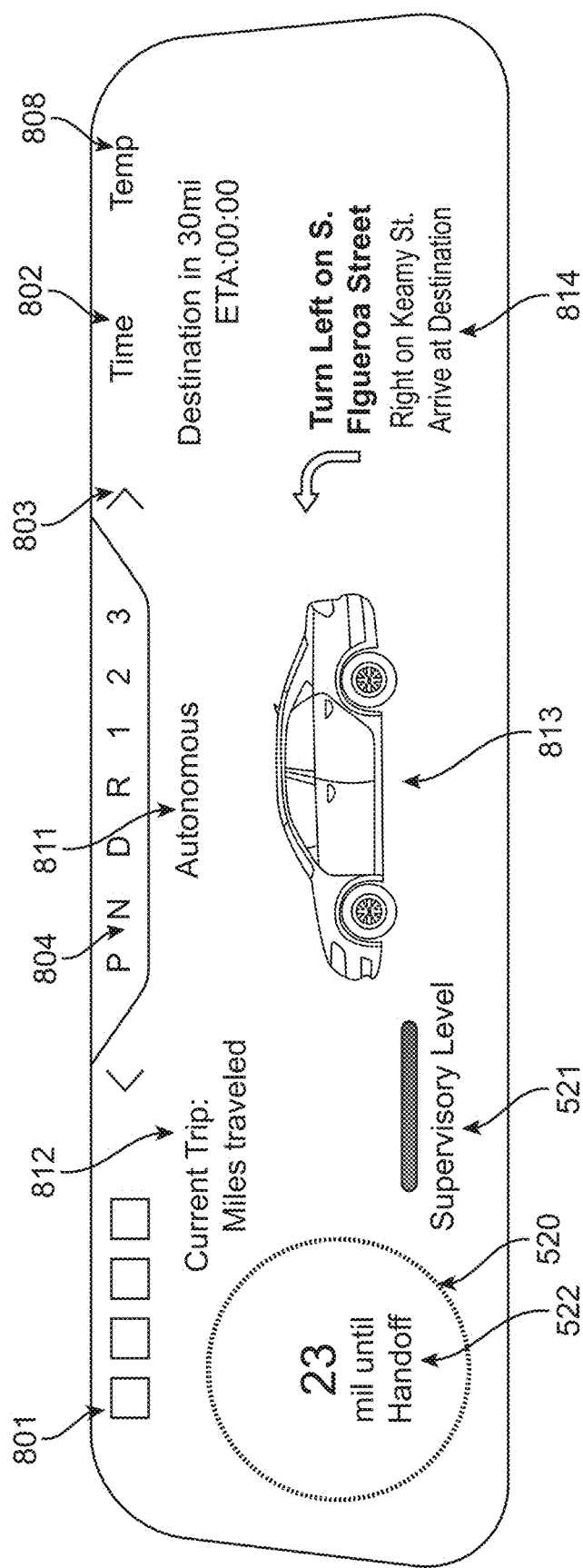

FIG. 8D illustrates examples of different alerts displayed on a dashboard display 420 inside a vehicle 100 in the autonomous mode, in accordance with an embodiment. As shown in FIG. 8D, in one embodiment, if the vehicle 100 is in the autonomous mode, the system 200 is configured to display at least one of the following on the dashboard display 420: (1) a set of warning lights 801 (e.g., brake warning light, temperature warning light, oil warning light, battery warning light), (2) a gear shift position indicator 804 indicative of a current gear shift of the vehicle 100 (e.g., park, drive, neutral, etc.), (3) an autonomous mode indicator 811 indicative of the vehicle 100 in autonomous drive, (4) a set of turn indicators 803 indicative of status of turn signal indicator lights of the vehicle 100 (e.g., whether left turn signal is activated, whether right turn signal is activated), (5) a clock indicator 802 indicative of a current time, (6) a temperature indicator 808 indicative of a current temperature at a current location of the vehicle 100, (7) an alert 814 indicative of trip-by-trip navigation, (8) a dynamic map view 813 of the vehicle 100, (9) a trip data indicator 812 indicative of amount of miles the vehicle 100 has traveled in a current trip, or (10) a set of alerts/notifications providing autonomous supervisory information, such as a dynamic circular icon 520, a supervisory level label 521, and a countdown timer 522.

Figure 8E:
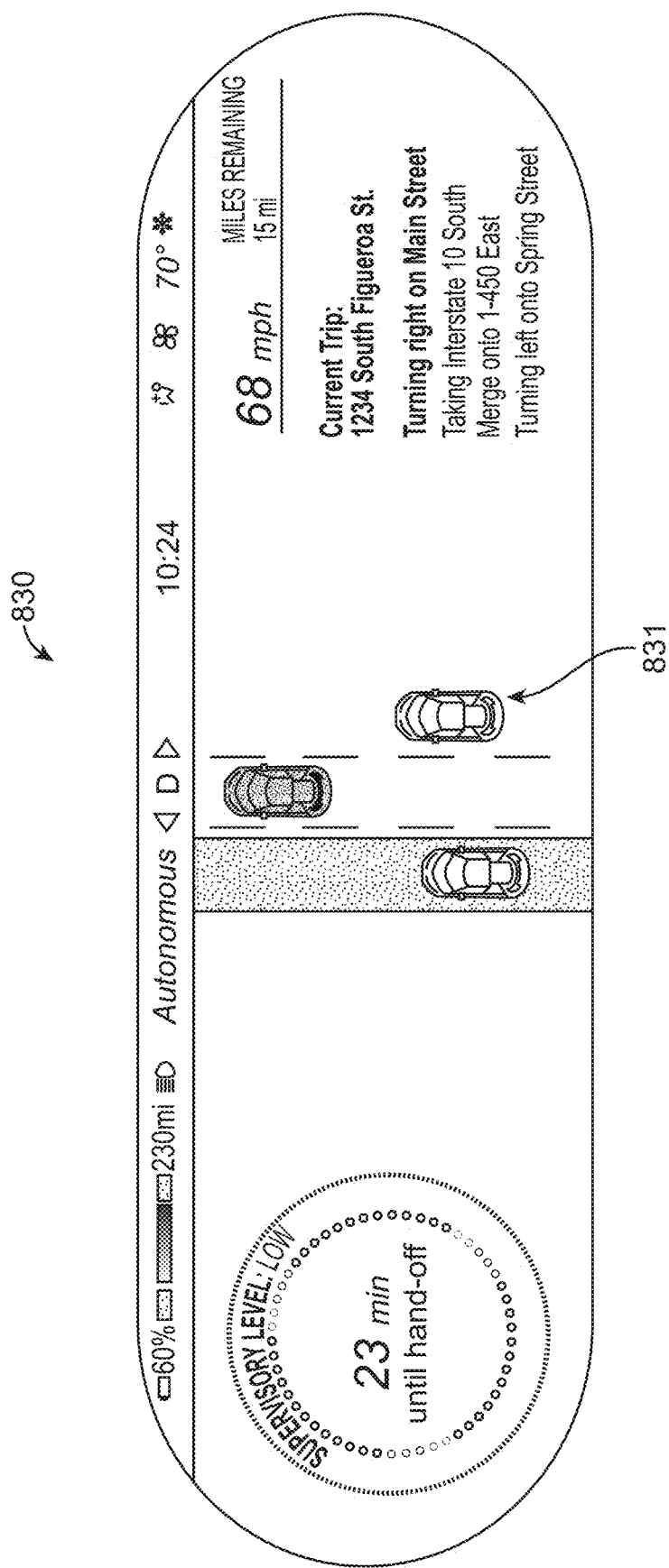

FIG. 8E illustrates an example UI 830 displayed on a dashboard display 420 inside a vehicle 100 in the autonomous mode, in accordance with an embodiment. In one embodiment, if the vehicle 100 is in the autonomous mode, the system 200 is configured to display on the dashboard display 420 a UI 830 comprising vehicle status and diagnostics information that is relevant to the vehicle 100 for autonomous drive such as, but not limited to, a dynamic map view 831 of the vehicle 100. The dynamic map view 831 is best suited to representing what the vehicle 100 sees and what the vehicle 100 needs to do, thereby providing a driver of the vehicle 100 with insight into driving decisions made by the vehicle 100 as the vehicle 100 drives autonomously. Based on sensor data of the vehicle 100, the dynamic map view 831 is indicative of an environment surrounding the vehicle 100, such as blind spots, lanes, other vehicles merging onto the same lane as the vehicle 100, objects behind the vehicle 100, etc. For example, as shown in FIG. 8E, if the system 200 detects based on the sensor data that another vehicle is approaching the vehicle 100 from behind, the system 200 automatically adjusts the dynamic map view 831 to show a three-hundred-and-sixty degree view of the vehicle 100 so that the driver can view objects behind the vehicle 100. This assists the driver with maintaining cognitive awareness of the environment surrounding the vehicle 100 and limits cognitive dissonance in the event the driver needs to take over control of the vehicle 100. This also helps build confidence of the driver in the ability of the vehicle 100 to drive autonomously.

In one embodiment, the information console 430 includes at least one of the following selectable tabs: (1) a sensor view tab 580 (FIG. 9E) for displaying different dynamic map views, (2) a car tab 581 (FIG. 9E) for displaying different alerts, notifications, and/or features included in the car category 492 (FIG. 2E), (3) a navigation tab 582 (FIG. 9E) for displaying different alerts, notifications, and/or features included in the navigation category 493 (FIG. 2E), (4) a media tab 583 (FIG. 9E) for displaying different alerts, notifications, and/or features included in the media category 494 (FIG. 2E), (5) a connect tab 584 (FIG. 9E) for displaying different alerts, notifications, and/or features included in the connect category 496 (FIG. 2E), and (6) a music tab 585 (FIG. 9E) for displaying different alerts, notifications, and/or features included in the music category 495 (FIG. 2E).

In one embodiment, if the vehicle 100 is in the autonomous mode, a user inside the vehicle 100 can access information about the autonomous drive as well as consume infotainment via the infotainment console 430. For example, in one embodiment, the system 200 is configured to display on the sensor view tab 580 of the infotainment console 430 a dynamic map view of the vehicle 100 best suited to representing what the vehicle 100 sees and what the vehicle 100 needs to do, thereby providing the user with insight into driving decisions made by the vehicle 100 as the vehicle 100 drives autonomously. Based on sensor data of the vehicle 100, the dynamic map view is indicative of an environment surrounding the vehicle 100, such as blind spots, lanes, other vehicles merging onto the same lane as the vehicle 100, objects behind the vehicle 100, etc. This assists the user with maintaining cognitive awareness of the environment surrounding the vehicle 100. This also helps build confidence of the user in the ability of the vehicle 100 to drive autonomously.

FIGS. 9A-9D illustrates examples of different dynamic map views displayed on a sensor view tab 580 (FIG. 9E) of an infotainment console 430 inside a vehicle 100 in autonomous mode, in accordance with an embodiment. Specifically, FIG. 9A illustrates a first example UI 580A including a first example dynamic map view 880 displayed on the sensor view tab 580 of the infotainment console 430, in accordance with an embodiment. The dynamic map view 880 represents a bird's eye view of the vehicle 100. Based on sensor data of the vehicle 100, the dynamic map view 880 is indicative of an environment surrounding the vehicle 100 and/or features, such as parking, lane markings, local signage, traffic lights, etc.

FIG. 9B illustrates a second example UI 580B including a second example dynamic map view 881 displayed on the sensor view tab 580 of the infotainment console 430, in accordance with an embodiment. The dynamic map view 881 represents a three-hundred-and-sixty-degree view of the vehicle 100. Based on sensor data of the vehicle 100, the dynamic map view 881 is indicative of an environment surrounding the vehicle 100, such as blind spots, lanes, other vehicles merging onto the same lane as the vehicle 100, objects behind the vehicle 100, etc.

For example, if the system 200 detects based on the sensor data that another vehicle is merging onto the same lane as the vehicle 100, the system 200 automatically adjusts a dynamic map view displayed on the sensor view tab 580 to the dynamic map view 881 to show a three-hundred-and-sixty degree view of the vehicle 100 so that the driver has situational awareness of the driving environment (i.e., surroundings) and can understand a driving decision made by the vehicle 100 (e.g., the vehicle 100 slows down, speeds up, changes lane, or sounds the horn to avoid collision with the other vehicle).

FIG. 9C illustrates a third example UI 580C including a third example dynamic map view 882 displayed on the sensor view tab 580 of the infotainment console 430, in accordance with an embodiment. The dynamic map view 882 represents a route overview of a route the vehicle 100 is on. Based on sensor data of the vehicle 100, the dynamic map view 882 is indicative of conditions of the route, such as status of the route, portions of the route where autonomous drive is available, or handoff warning information.

For example, if a driver of the vehicle 100 is viewing infotainment on the infotainment console 430 and the system 200 determines that the vehicle 100 can no longer safely drive autonomously, the system 200 can take over the infotainment console 430 and interrupt/pause playback of the infotainment via the handoff warning information to alert the driver of the need to take over control of the vehicle 100.

FIG. 9D illustrates a fourth example UI 580D including a fourth example dynamic map view 883 displayed on the sensor view tab 580 of the infotainment console 430, in accordance with an embodiment. The dynamic map view 883 represents a street view of the vehicle 100. Based on sensor data of the vehicle 100, the dynamic map view 883 is indicative of an environment surrounding the vehicle 100 and/or features, such as blind curves, points of interest, further way information, park assist, auto valet, etc.

FIG. 9E illustrates an example UI 580E displayed on a car tab 581 of an infotainment console 430 inside a vehicle 100 in autonomous mode, in accordance with an embodiment. In one embodiment, the UI 580E includes, but is not limited to, alerts indicative of at least one of the following: sensor data (e.g., tire pressure, etc.), vehicle health, driving data (e.g., fuel economy, total mileage traveled, etc.), etc.

FIG. 9F illustrates an example UI 580F displayed on a navigation tab 582 of an infotainment console 430 inside a vehicle 100 in autonomous drive, in accordance with an embodiment. In one embodiment, the UI 580F includes, but is not limited to, at least one of the following: (1) route information related to a route the vehicle 100 is on, such as a dynamic map view of the route, turn-by-turn navigation, etc., (2) autonomous supervisory information relating to the autonomous drive (e.g., autonomous indicator information, autonomous supervisory information), such as a circular icon 520, and (3) features allowing a user inside the vehicle 100 to make adjustments to the autonomous drive, such as update the route to an alternative route, add a stop, safe stop, etc.

In one embodiment, a user can make an adjustment to the autonomous drive by selecting a different route on the navigation tab to re-direct the vehicle 100 to follow the different route.

Figure 10:
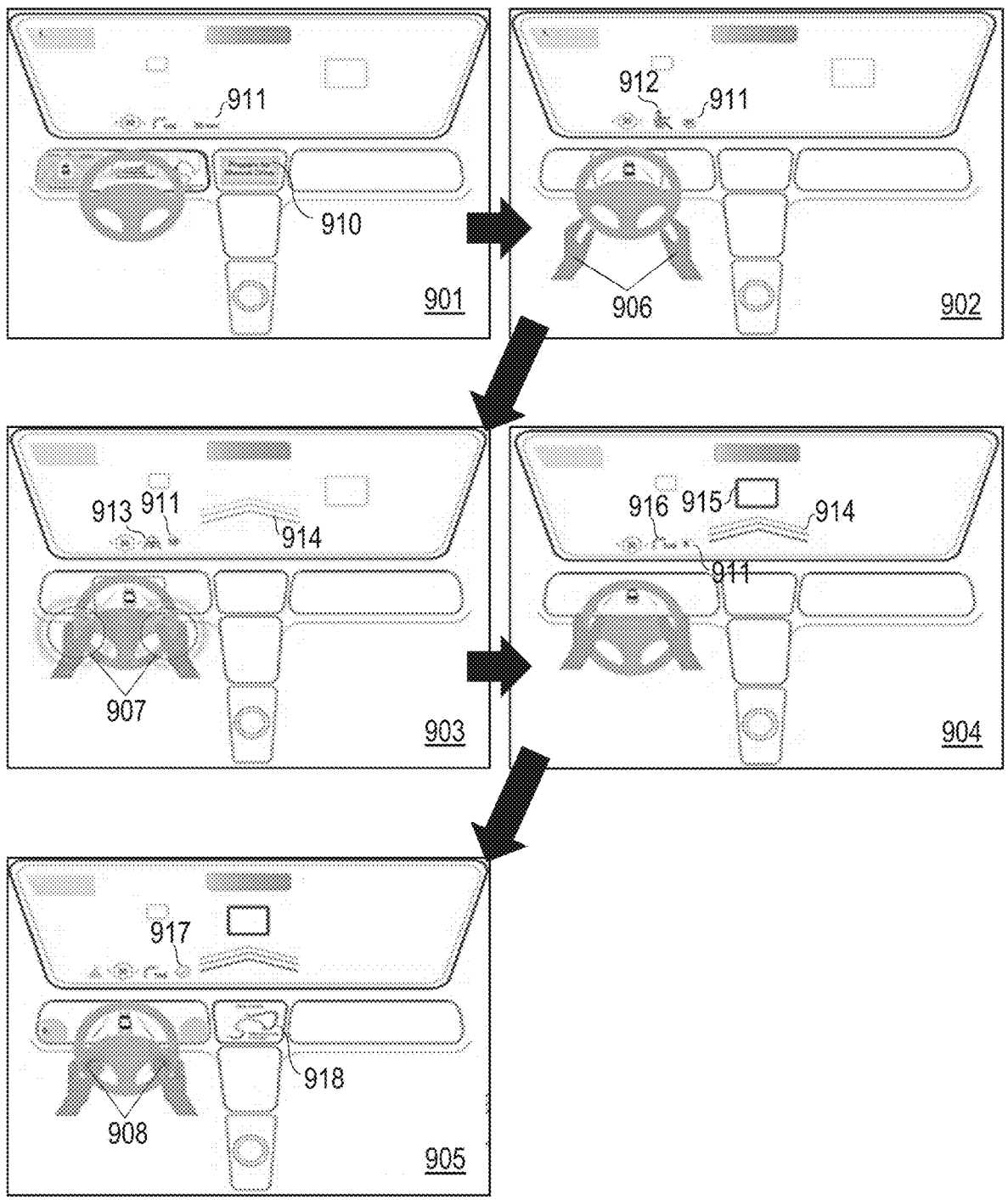
FIG. 10 is a sequence of panels illustrating alerts provided inside a vehicle by the system and actions to be performed by a driver before, during, and after handoff of control of the vehicle to the driver (i.e., transitioning from the autonomous mode to the manual mode), in accordance with an embodiment.

FIG. 10 is a sequence of panels 901-905 illustrating alerts provided by the system 200 and actions performed by the driver before, during, and after handoff of control of the vehicle 100 to the driver (i.e., transitioning from the autonomous mode to the manual mode), in accordance with an embodiment. In one embodiment, the system 200 provides, as shown in panel 901, alerts to notify the driver of the handoff and an amount of time (e.g., seconds) remaining until the vehicle 100 stops operating in the autonomous mode such as, but not limited to, the following: an audio alert produced via an audio device inside the vehicle 100 and stating "I need you to take over because [reason why autonomous drive is coming to an end]. Prepare for manual drive in 30 seconds", a notification 910 displayed on the infotainment console 430 and stating "Prepare for Manual Drive", a dynamic countdown timer 911 displayed on the head-up display 410 and indicating that the amount of time remaining is 30 seconds ("30 sec"), etc.

Next, the system 200 provides, as shown in panel 902, alerts to notify the driver of a first set of actions for the driver to perform to prepare the driver to take over control of the vehicle 100 such as, but not limited to, the following: an audio alert produced via an audio device inside the vehicle 100 and stating "Place hands on wheel and place foot on pedal," an icon 912 displayed on the head-up display 410 and illustrating the first set of actions for the driver to perform (e.g., position both hands on the steering wheel and one foot on the brake pedal), etc. In response to hearing and viewing the alerts, the driver reaches towards the steering wheel with both hands, as illustrated using reference numeral 906 in panel 902, and positions both hands on the steering wheel, as illustrated using reference numeral 907 in panel 903.

Next, the system 200 waits and determines whether the driver has performed the first set of actions. If the driver has not performed the first set of actions and the amount of time has not yet expired, the system 200 provides reminder alerts in the interim. If the driver has not performed the first set of actions and the amount of time remaining expires, the vehicle 100 autonomously brings itself to a safe stop (e.g., the vehicle 100 pulls over to a side of a roadway). If the driver has performed the first set of actions, the system 200 provides, as shown in panel 903, alerts to notify the driver of information that is immediately relevant to the driver for vehicle safety and improved driving and a second set of actions for the driver to perform to confirm the driver is ready to take over control of the vehicle 100 such as, but not limited to, the following: an audio alert produced via an audio device inside the vehicle 100 and stating "You are currently in [current location of the vehicle 100, e.g., Westwood, Calif.]. Speed limit is [speed limit on speed limit traffic sign, e.g., 35 mph]. When you are ready, press buttons to drive.", a steering wheel icon 913 displayed on the head-up display 410 and illustrating the second set of actions for the driver to perform (e.g., press/tap buttons/paddles positioned right below the thumb zone on the steering wheel), a dynamic lane marking 914 displayed on the head-up display 410, etc. As shown in panel 903, the countdown timer 911 automatically changes to indicate that the amount of time remaining is 10 seconds ("10"). In one embodiment, if there is no obstacle or a distance between the vehicle 100 and a detected obstacle is large, the lane marking 914 is displayed in a cool/passive color (e.g., green); otherwise, the lane marking 914 is displayed in a warm/active color (e.g., red) to warn the driver of the detected obstacle.

Next, the system 200 waits and determines whether the driver has performed the second set of actions. If the driver has not performed the second set of actions and the amount of time has not yet expired, the system 200 provides reminder alerts in the interim, such as an audio alert produced via an audio device inside the vehicle 100 and inquiring "Are you ready?". The system 200 also provides, as shown in panel 904, alerts in the interim to notify the driver of updates to the information that is immediately relevant to the driver and the amount of time remaining such as, but not limited to, the following: an audio alert produced via an audio device inside the vehicle 100 and counting down the amount of time remaining, an obstacle detection box 915 displayed on the head-up display 410 and indicative of a detected obstacle, an alert 916 indicative of turn-by-turn navigation, etc. As shown in panel 904, the countdown timer 911 automatically changes to indicate that the amount of time remaining is 5 seconds ("5"). In response to hearing and viewing the alerts, the driver acclimates to the driving environment, and presses/taps the buttons/paddles on the steering wheel to confirm that the drive is ready to take over control of the vehicle 100, as illustrated using reference numeral 908 in panel 905.

If the driver has not performed the second set of actions and the amount of time remaining expires, the vehicle 100 autonomously brings itself to a safe stop (e.g., the vehicle 100 pulls over to a side of a roadway). If the driver has performed the second set of actions and the system 200 confirms the driver is looking ahead based on sensor data related to the driver (e.g., data from interior facing cameras, eye tracking technology, etc.), the system 200 provides, as shown in panel 905, alerts to notify the driver that the vehicle 100 is now in the manual mode such as, but not limited to, the following: an audio alert produced via an audio device inside the vehicle 100 and stating "Handoff complete. You are now in control.", a checkmark indicator 917 displayed on the head-up display 410 and indicative of successful completion of the handoff, etc.

In response to the successful completion of the handoff, the system 200 changes a UI/UX design for the vehicle 100 (e.g., changing UIs on the head-up display 410, the dashboard display 420, the infotainment console 430, etc.) to one that is optimized for the manual mode. For example, in the manual mode, the system 200 displays on the infotainment console 430 a dynamic map view 918 of the vehicle 100, wherein the map view 918 is initially a bird's eye view to allow the driver to get better acclimated to the driving environment, and later changes (e.g., after a few minutes) to a route overview to inform the driver of portions of a route the vehicle 100 is on where autonomous drive is available.

The amount of time required for the vehicle 100 to transition from the autonomous mode to the manual mode will vary among different vehicle manufacturers. For example, in one embodiment, the amount of time required for the vehicle 100 to transition from the autonomous mode to the manual mode is 30 seconds or less.

Figure 11:
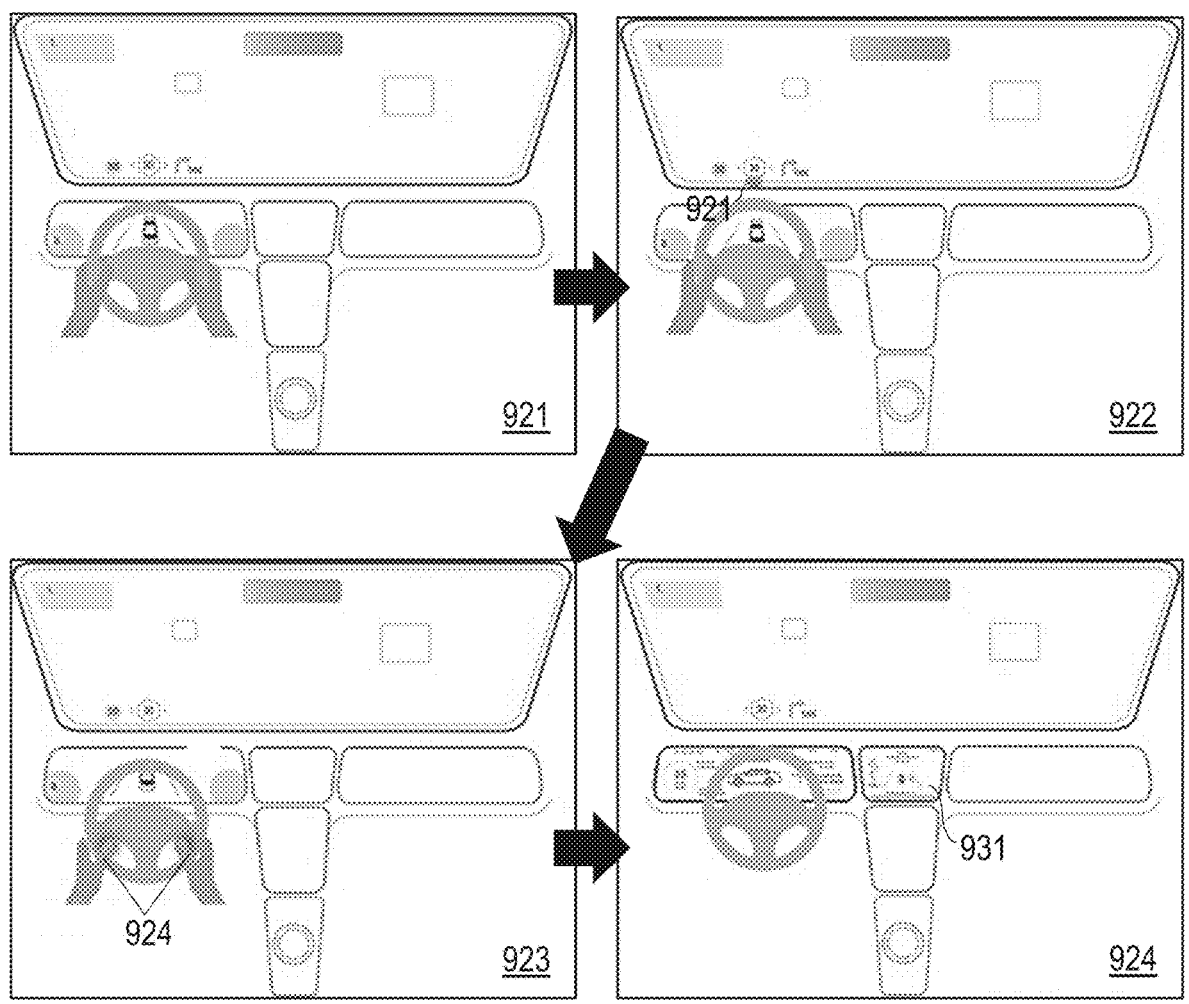
FIG. 11 is a sequence of panels illustrating alerts provided inside a vehicle by the system and actions to be performed by a driver before, during, and after handoff of control of the vehicle from the driver (i.e., transitioning from the manual mode to the autonomous mode), in accordance with an embodiment.

FIG. 11 is a sequence of panels 921-924 illustrating alerts provided by the system 200 and actions performed by the driver before, during, and after handoff of control of the vehicle 100 from the driver (i.e., transitioning from the manual mode to the autonomous mode), in accordance with an embodiment. In one embodiment, the system 200 provides, as shown in panel 921, alerts to notify the driver of information immediately relevant to the driver for vehicle safety and improved driving.

If the system 200 determines that autonomous drive is available, the system 200 provides, as shown in panel 922, alerts to notify the driver that autonomous drive is available such as, but not limited to, an autonomous icon 931 displayed (or illuminated) on the head-up display 410 and indicative of the availability of autonomous drive, an audio alert produced via an audio device inside the vehicle 100 and stating "Autonomous drive is available.". In response to hearing and viewing the alerts, the driver presses and holds buttons/paddles positioned right below the thumb zone on the steering wheel to initiate autonomous drive, as illustrated using reference numeral 924 in panel 923.

In response to the driver pressing and holding the buttons/paddles on the steering wheel, the system 200 provides alerts to notify the driver of a set of actions for the driver to perform to confirm the driver is ready to transfer control of the vehicle 100 such as, but not limited to, the following: an audio alert produced via an audio device inside the vehicle 100 and stating "Initiating autonomous mode. Press and hold for [amount of time required to transition from the manual mode to the autonomous mode, e.g., 3 seconds] to start autonomous driving.", etc.

If the driver has performed the set of actions, the system 200 provides alerts to notify the driver of successful completion of the handoff and that the vehicle 100 is now in the autonomous mode such as, but not limited to, the following: an audio alert produced via an audio device inside the vehicle 100 and stating "You may let go of the steering wheel. Remember, I may need your help to drive at times, so make sure to keep an eye on the road,", etc.

Next, the system 200 provides alerts to notify the driver of autonomous information related to the autonomous drive such as, but not limited to, the following: an audio alert produced via an audio device inside the vehicle 100 and stating "Autonomous drive will continue for [mileage countdown information, e.g., 10 miles] or approximates [time countdown information, e.g., 35 minutes].", etc.

In one embodiment, the system 200 determines whether the amount of distance the vehicle 100 can drive autonomously is less than a corresponding pre-determined threshold. If the amount of distance is less, the system 200 delays transitioning to the autonomous mode until conditions for autonomous drive improve.

In response to the successful completion of the handoff, the system 200 changes a UI/UX design for the vehicle 100 (e.g., changing UIs on the head-up display 410, the dashboard display 420, the infotainment console 430, etc.) to one that is optimized for the autonomous mode. For example, in the autonomous mode, the system 200 initially displays on the infotainment console 430 a route overview 931 to inform the driver of how long the vehicle 100 will be in autonomous drive and when the driver is expected to take over control of the vehicle 100, then displays other dynamic map views or infotainment.

In one embodiment, the amount of time required for the vehicle 100 to transition from the manual mode to the autonomous mode is shorter than the amount of time required for the vehicle 100 to transition from the autonomous mode to the manual mode. As the driver initiates autonomous drive, there is no need to factor in time to allow the driver to re-acclimate to the driving environment. The amount of time required for the vehicle 100 to transition from the manual mode to the autonomous mode will vary among different vehicle manufacturers. For example, in one embodiment, the amount of time required for the vehicle 100 to transition from the manual mode to the autonomous mode is 3 seconds or less.

Figure 12A:
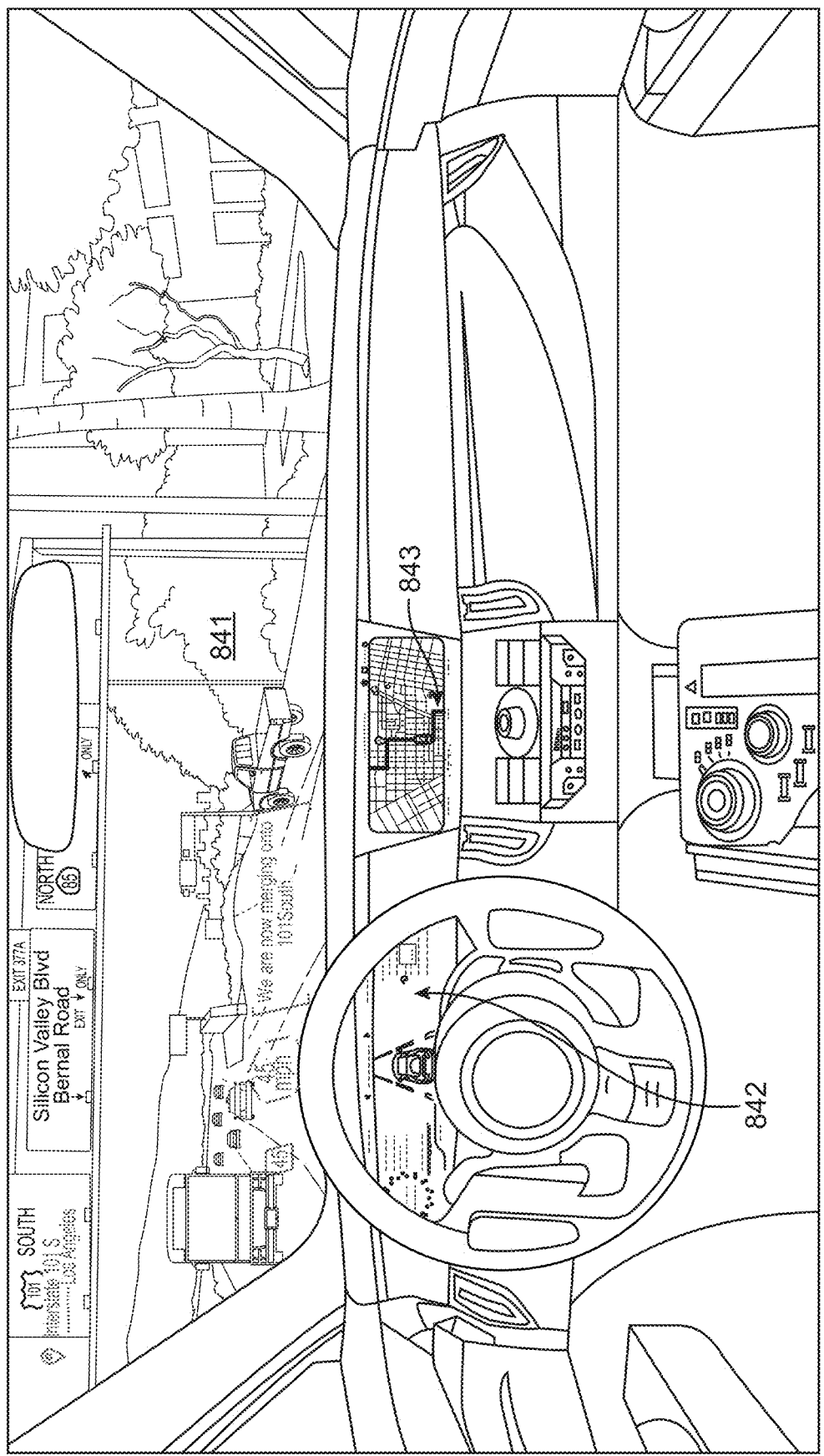
FIG. 12A illustrates an example of different UIs displayed on different display devices inside a vehicle before handoff of control of the vehicle to a driver, in accordance with an embodiment.
Figure 12B:
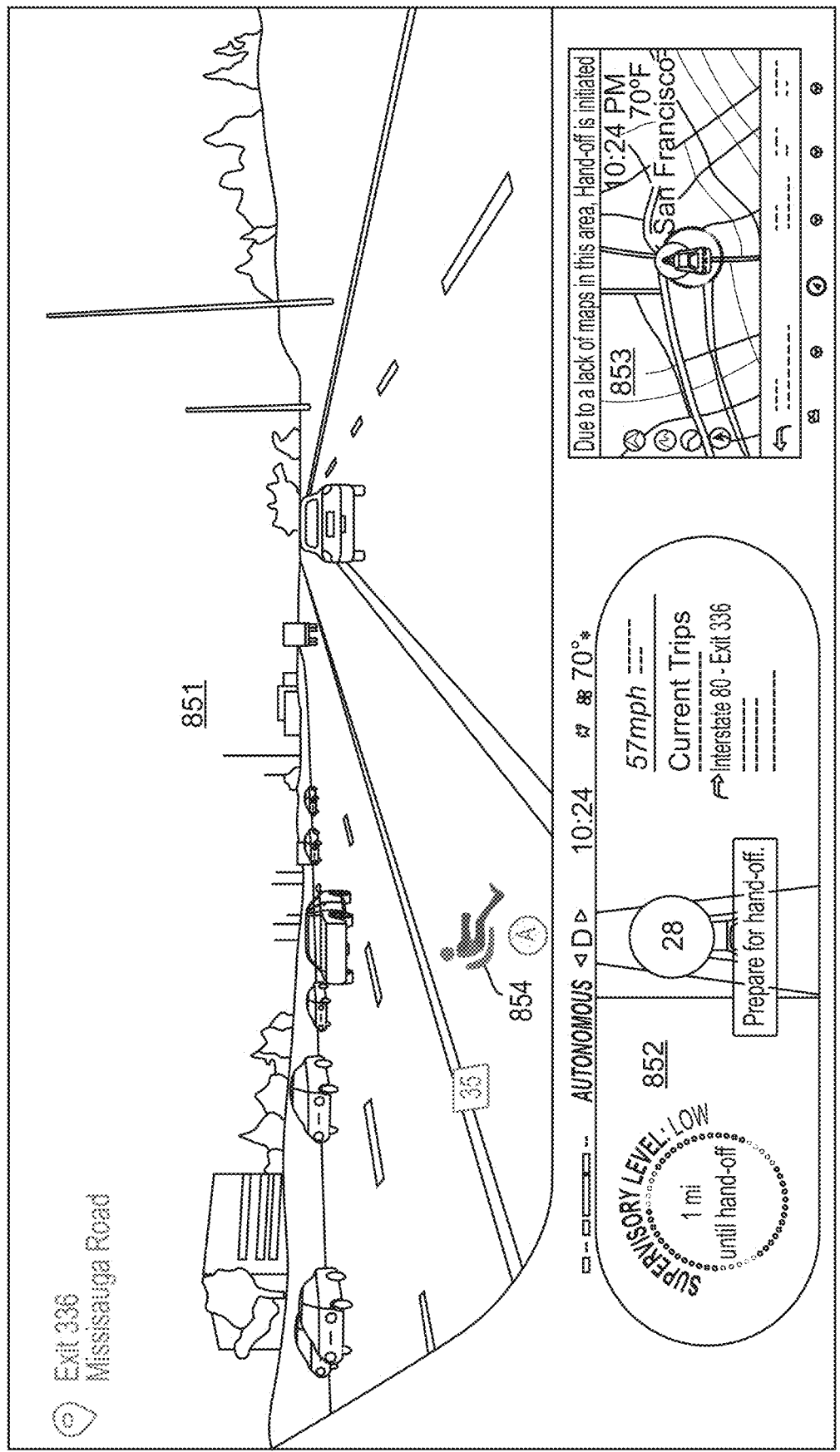
FIG. 12B illustrates an example of different UIs displayed on different display devices inside a vehicle during handoff of control of the vehicle to a driver, in accordance with an embodiment.
Figure 12C:
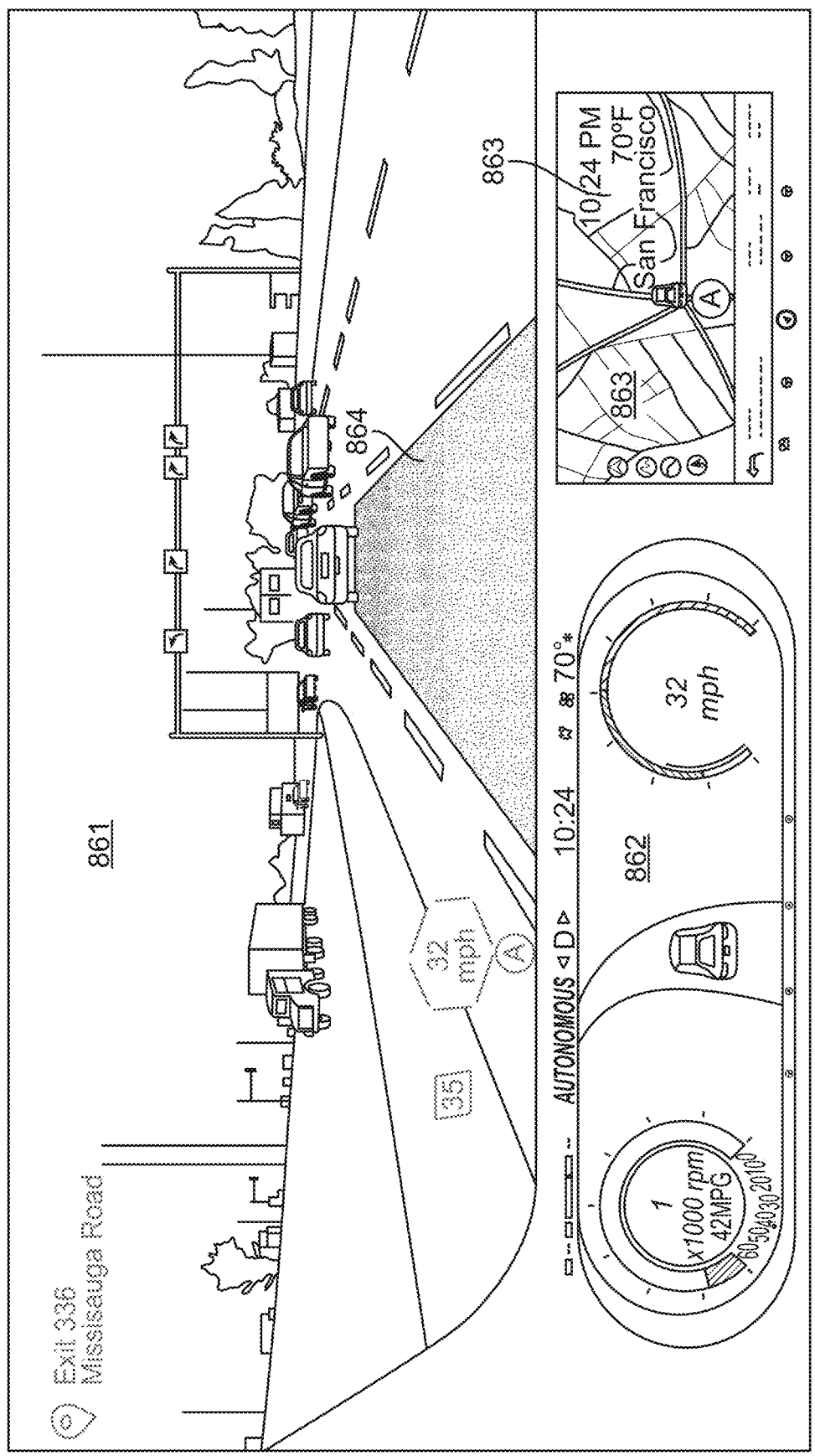
FIG. 12C illustrates an example of different UIs displayed on different display devices inside a vehicle after the handoff of control of the vehicle to a driver, in accordance with an embodiment.

FIGS. 12A-12C illustrating changes in UI/UX design for the vehicle 100 before, during, and after handoff of control of the vehicle 100 to the driver (i.e., transitioning from the autonomous mode to the manual mode), in accordance with an embodiment. Specifically, FIG. 12A illustrates an example of different UIs displayed on different display devices inside the vehicle 100 before the handoff, in accordance with an embodiment. As shown in FIG. 12A, the head-up display 410 displays a UI 841 including information indicative of the following: current location of the vehicle 100, speed limit traffic sign, current speed of the vehicle 100, and driving decisions the vehicle 100 has made (e.g., "We are now merging onto 101 South"]. The dashboard display 420 displays a UI 842 including autonomous supervisory information and a dynamic map view of the vehicle 100. The infotainment console 430 displays a UI 843 including a route overview of a route the vehicle 100 is on.

In one embodiment, as less cognitive awareness is required from the driver when the vehicle 100 is driving autonomously, the system 200 adjusts the interior lighting inside the vehicle in response to the vehicle 100 transitioning to the autonomous mode. For example, the system 200 decreases brightness/intensity of one or more lights and/or display devices inside the vehicle 100. As another example, the system 200 switches to using cool/passive colors for ambient lighting inside the vehicle.

FIG. 12B illustrates an example of different UIs displayed on different display devices inside the vehicle 100 during the handoff, in accordance with an embodiment. As shown in FIG. 12B, the head-up display 410 displays a UI 851 including information indicative of the following: current location of the vehicle 100, speed limit traffic sign, and actions the driver has to perform to prepare for the handoff. For example, in one embodiment, the UI 851 includes an icon 854 comprising a side view of a stick figure seated in a driver seat. One or more portions of the stick figure are highlighted to illustrate actions the driver has to perform to prepare for the handoff. For example, an arm and a leg of the stick figure may be highlighted to instruct the driver to place both hands on the steering wheel and one foot on the brake. The dashboard display 420 displays a UI 852 including autonomous supervisory information, a dynamic map view of the vehicle 100, and a handoff warning. The infotainment console 430 displays a UI 853 including a route overview of a route the vehicle 100 is on and a handoff warning.

FIG. 12C illustrates an example of different UIs displayed on different display devices inside the vehicle 100 after the handoff, in accordance with an embodiment. As shown in FIG. 12C, the head-up display 410 displays a UI 861 including information indicative of the following: current location of the vehicle 100, speed limit traffic sign, current speed of the vehicle 100, and a dynamic lane marking indicator 864 indicative of a distance between the vehicle 100 and a detected obstacle. The dashboard display 420 displays a UI 862 including a dynamic map view of the vehicle 100. The infotainment console 430 displays a UI 863 including a route overview of a route the vehicle 100.

In one embodiment, as more cognitive awareness is required from the driver when the driver is driving the vehicle 100, the system 200 adjusts the interior lighting inside the vehicle in response to the vehicle 100 transitioning to the manual mode. For example, the system 200 increases brightness/intensity of one or more lights and/or display devices inside the vehicle 100. As another example, the system 200 switches to using warm/active colors (e.g., red) for ambient lighting inside the vehicle.

Figure 13:
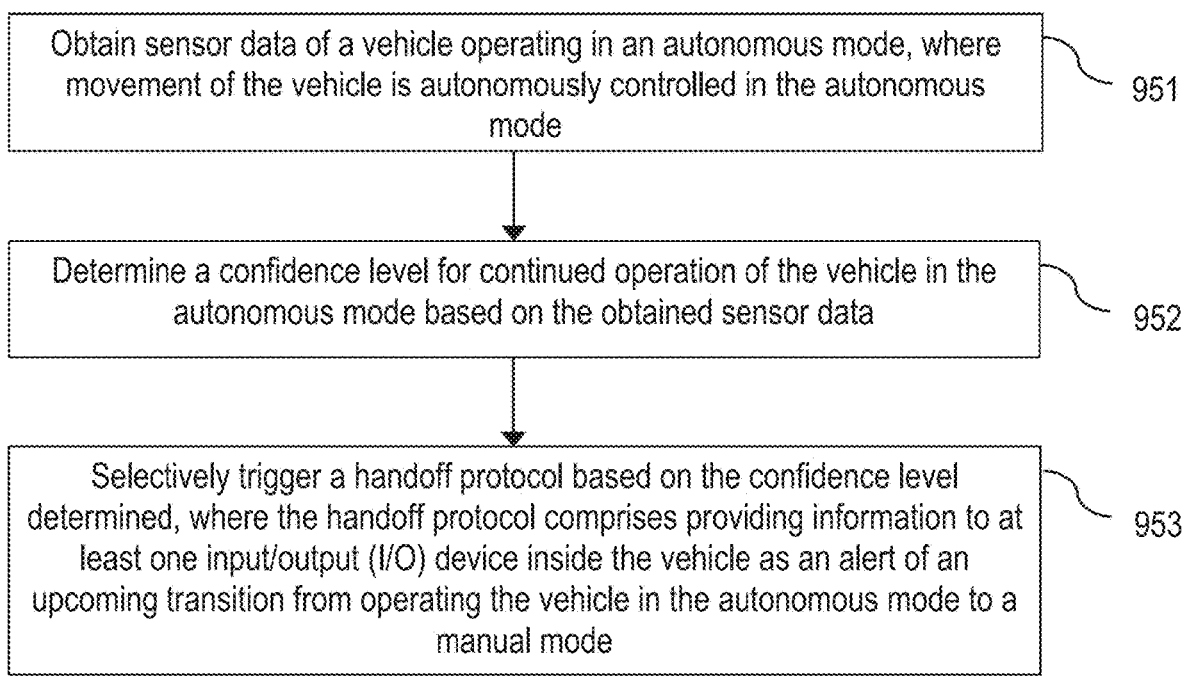
FIG. 13 is a flowchart of an example process for monitoring a vehicle in autonomous drive, in one or more embodiments.

FIG. 13 is a flowchart of an example process 950 for monitoring a vehicle in autonomous drive, in one or more embodiments. In process block 951, obtain sensor data of a vehicle (e.g., vehicle 100) operating in an autonomous mode, wherein movement of the vehicle is autonomously controlled in the autonomous mode. In process block 952, determine a confidence level for continued operation of the vehicle in the autonomous mode based on the obtained sensor data. In process block 953, selectively trigger a handoff protocol based on the confidence level determined, where the handoff protocol comprises providing information to at least one I/O device inside the vehicle as an alert of an upcoming transition from operating the vehicle in the autonomous mode to a manual mode.

In one embodiment, process blocks 951-953 may be performed by at least one component of the system 200.

Figure 14:
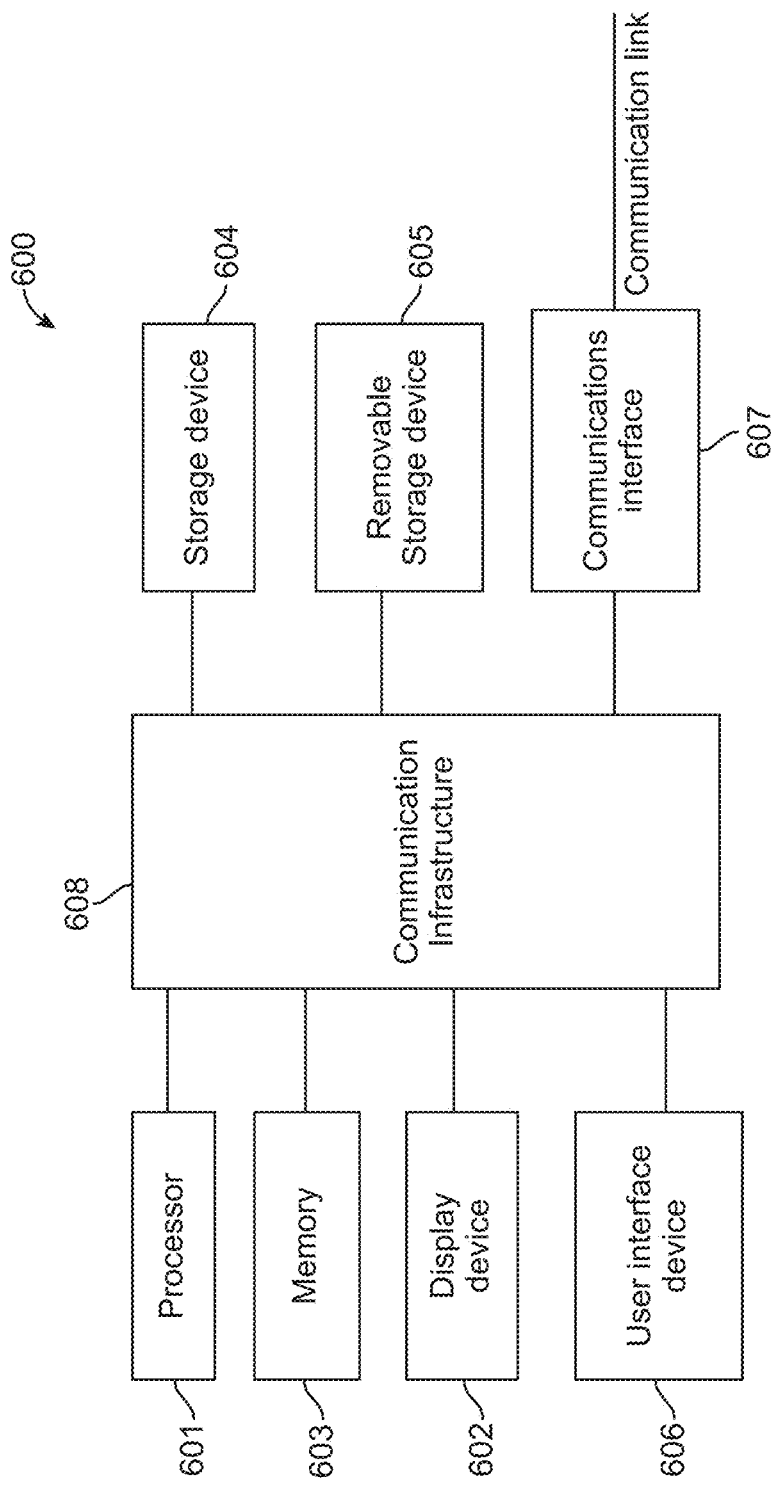
FIG. 14 is a high-level block diagram showing an information processing system comprising a computer system useful for implementing the disclosed embodiments.

FIG. 14 is a high-level block diagram showing an information processing system comprising a computer system 600 useful for implementing the disclosed embodiments. Computer system 600 may be incorporated in a vehicle 100. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electro-magnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 950 (FIG. 13) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures or concurrently.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software or micro-code) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including a product oriented programming language such as Java, Smalltalk, C++ or the like and conventional procedural programming languages, such as the "C" programming language or similar programming languages. The program code may execute entirely on the viewer's computer, partly on the viewer's computer, as a stand-alone software package, partly on the viewer's computer and partly on a remote computer or entirely on the remote computer or server. In the latter scenario, the remote computer may be connected to the viewer's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A system comprising:
   at least one processor; and
   a non-transitory processor-readable memory device storing instructions that when executed by the at least one processor causes the at least one processor to perform operations including to:
      obtain sensor data of a vehicle operating in an autonomous mode, wherein movement of the vehicle is autonomously controlled in the autonomous mode;
      determine a confidence level for continued operation of the vehicle in the autonomous mode based on the obtained sensor data; and
      trigger a handoff protocol when the confidence level is below a pre-determined threshold, wherein the handoff protocol comprises:
         providing information to at least one input/output (I/O) device inside the vehicle that outputs the information as a set of alerts of an upcoming transition from operating the vehicle in the autonomous mode to a manual mode, and the information outputted includes an alert indicative of a user action to perform inside the vehicle as user preparation to take over control of the vehicle;
         determining whether the user action has been performed; and
         in response to determining the user action has been performed, updating the information outputted to include another alert indicative of another user action to perform inside the vehicle as user confirmation of user readiness to take over control of the vehicle.

2. The system of claim 1, wherein the information outputted includes an alert indicative of the confidence level.

3. The system of claim 1, wherein the at least one processor further performs operations to:
   determine an amount of time remaining for the operation of the vehicle in the autonomous mode, wherein the information outputted includes a countdown timer that counts down the amount of time remaining for the operation of the vehicle in the autonomous mode, and the vehicle transitions to manual mode operation when the operation of the vehicle in the autonomous mode ends.

4. The system of claim 1, wherein the at least one I/O device comprises at least one of the following: a display device, an audio device, or a haptic feedback device.

5. The system of claim 1, wherein the obtained sensor data comprises data indicative of a current activity of a user inside the vehicle.

6. The system of claim 5, wherein the at least one processor further performs operations to:
determine which of the at least one I/O device to utilize in outputting the information to increase a likelihood that the user is alerted to the upcoming transition.

7. The system of claim 6, wherein the at least one processor further performs operations to:
determine a field of vision of the user based on the obtained sensor data;
determine one or more display devices available inside the vehicle that are substantially within the field of vision of the user; and
display one or more visual alerts on the one or more display devices to alert the user to the upcoming transition;
wherein the one or more display devices comprise at least one of the following: a head-up display, a dashboard display, an infotainment console, a light indicator, or a mobile electronic device.

8. The system of claim 6, wherein the at least one processor further performs operations to:
determine whether an environment inside the vehicle is suitable for providing audio alerts of the upcoming transition based on the obtained sensor data; and
produce an audio alert via an audio device available inside the vehicle in response to determining the environment inside the vehicle is suitable for providing audio alerts;
wherein the audio device comprises at least one of the following: a speaker device or a mobile electronic device.

9. The system of claim 6, wherein the at least one processor further performs operations to:
determine whether an environment inside the vehicle is suitable for haptic alerts of the upcoming transition based on the obtained sensor data; and
produce a haptic alert via a haptic feedback device available inside the vehicle in response to determining the environment inside the vehicle is suitable for haptic alerts;
wherein the haptic feedback device comprises at least one of the following: a driver seat of the vehicle, a steering wheel of the vehicle, or a mobile electronic device.

10. The system of claim 1, wherein the at least one processor further performs operations to:
display a visual alert on a display device inside the vehicle that is substantially within a line of vision of the user in response to the vehicle transitioning from operating in the automatic mode to the manual mode, wherein the visual alert is indicative of an action for the user to perform to complete the handoff protocol, and the display device comprise at least one of a head-up display or a dashboard display.

11. The system of claim 1, wherein the at least one processor further performs operations to:
produce one or more audio alerts via one or more audio devices inside the vehicle in response to the vehicle transitioning from operating in the automatic mode to the manual mode, wherein the one or more audio alerts are indicative of one or more actions for the user to perform to complete the handoff protocol, and the one or more audio devices comprise at least one of the following: a speaker device, or a mobile electronic device.

12. The system of claim 1, wherein the at least one processor further performs operations to:
output a first set of information via the at least one I/O device in response to the vehicle operating in the autonomous mode, wherein the first set of information is optimized for the autonomous mode; and
output a second set of information via the at least one I/O device in response to the vehicle operating in the manual mode, wherein the second set of information is optimized for the manual mode, and the first set of information and the second set of information are different to distinguish between the vehicle operating in the autonomous mode and the vehicle operating in the manual mode.

13. The system of claim 1, wherein the at least one processor further performs operations to:
determine an amount of distance remaining for the operation of the vehicle in the autonomous mode, wherein the information outputted includes the amount of distance remaining for the operation of the vehicle in the autonomous mode.

14. The system of claim 1, wherein the at least one processor further performs operations to:
receive a first location and a second location; and
provide one or more routes available between the first location and the second location for selection, wherein each route includes information indicative of whether the vehicle is operable in the autonomous mode for one or more portions of the route.

15. A method comprising:
obtaining sensor data of a vehicle operating in an autonomous mode from one or more sensor devices, wherein movement of the vehicle is autonomously controlled in the autonomous mode;
determining, at a processor device, a confidence level for continued operation of the vehicle in the autonomous mode based on the obtained sensor data; and
triggering, at the processor device, a handoff protocol when the confidence level is below a pre-determined threshold, wherein the handoff protocol comprises:
providing information to at least one input/output (I/O) device inside the vehicle that outputs the information as a set of alerts of an upcoming transition from operating the vehicle in the autonomous mode to a manual mode, and the information outputted includes an alert indicative of a user action to perform inside the vehicle as user preparation to take over control of the vehicle;
determining whether the user action has been performed; and
in response to determining the user action has been performed, updating the information outputted to include another alert indicative of another user action to perform inside the vehicle as user confirmation of user readiness to take over control of the vehicle.

16. The method of claim 15, wherein the information outputted includes an alert indicative of the confidence level.

17. The method of claim 15, further comprising:
determining, at the processor device, a field of vision of a user inside the vehicle based on the obtained sensor data;
determining, at the processor device, one or more display devices available inside the vehicle that are substantially within the field of vision of the user; and
displaying one or more visual alerts on the one or more display devices to alert the user to the upcoming transition;
wherein the one or more display devices comprise at least one of the following: a head-up display, a dashboard display, an infotainment console, a light indicator, or a mobile electronic device.

18. The method of claim 15, further comprising:
determining, at the processor device, whether an environment inside the vehicle is suitable for providing audio alerts of the upcoming transition based on the obtained sensor data; and
producing an audio alert via an audio device available inside the vehicle in response to determining the environment inside the vehicle is suitable for providing audio alerts;
wherein the audio device comprises at least one of the following: a speaker device or a mobile electronic device.

19. The method of claim 15, further comprising:
determining, at the processor device, whether an environment inside the vehicle is suitable for haptic alerts of the upcoming transition based on the obtained sensor data; and
producing a haptic alert via a haptic feedback device available inside the vehicle in response to determining the environment inside the vehicle is suitable for haptic alerts;
wherein the haptic feedback device comprises at least one of the following: a driver seat of the vehicle, a steering wheel of the vehicle, or a mobile electronic device.

20. A non-transitory computer readable storage medium including instructions to perform a method comprising:
determining a field of vision of a user inside a vehicle operating in an autonomous mode based on sensor data captured, wherein movement of the vehicle is autonomously controlled in the autonomous mode;
determining one or more display devices available inside the vehicle that are substantially within the field of vision of the user;
displaying one or more visual alerts on the one or more display devices to alert the user of an upcoming transition from operating the vehicle in the autonomous mode to a manual mode, wherein the one or more visual alerts displayed includes a visual alert indicative of an action for the user to perform as preparation for the user to take over control of the vehicle;
determining whether the user has performed the action; and
in response to determining the user has performed the action, updating the one or more visual alerts displayed to include another visual alert indicative of another action for the user to perform as confirmation the user is ready to take over control of the vehicle;
wherein the one or more display devices comprise at least one of the following: a head-up display, a dashboard display, an infotainment console, a light indicator, or a mobile electronic device.

* * * * *